US010499768B2

(12) United States Patent
Hagström

(10) Patent No.: US 10,499,768 B2
(45) Date of Patent: Dec. 10, 2019

(54) PORTABLE STOVE AND METHOD FOR OPERATING A LOCKING MECHANISM THEREOF

(71) Applicant: Fenix Outdoor Development and CSR AG, Zug (CH)

(72) Inventor: Magnus Hagström, Tyresö (SE)

(73) Assignee: Fenix Outdoor Development and CSR AG, Zug (CH)

( * ) Notice: Subject to any disclaimer, the term of this patent is extended or adjusted under 35 U.S.C. 154(b) by 156 days.

(21) Appl. No.: 15/739,514

(22) PCT Filed: May 23, 2016

(86) PCT No.: PCT/EP2016/061591
§ 371 (c)(1),
(2) Date: Dec. 22, 2017

(87) PCT Pub. No.: WO2016/185052
PCT Pub. Date: Nov. 24, 2016

(65) Prior Publication Data
US 2018/0184844 A1 Jul. 5, 2018

(30) Foreign Application Priority Data
May 21, 2015 (DE) .......................... 10 2015 108 089

(51) Int. Cl.
*F24C 3/14* (2006.01)
*A47J 37/07* (2006.01)
*F24C 15/26* (2006.01)

(52) U.S. Cl.
CPC .............. *A47J 37/0763* (2013.01); *F24C 3/14* (2013.01); *F24C 15/26* (2013.01); *A47J 2037/0777* (2013.01)

(58) Field of Classification Search
CPC .............. F24C 15/26; F24C 3/14; A47J 37/07
(Continued)

(56) References Cited

U.S. PATENT DOCUMENTS 2,473,458 A * 6/1949 Walker .................... F24B 1/202
126/25 R
2,477,529 A * 7/1949 Sprinkle ............. A47J 37/0763
126/14
(Continued)

FOREIGN PATENT DOCUMENTS

CN 2447655 Y 9/2001
CN 2540575 Y 3/2003
(Continued)

OTHER PUBLICATIONS

European Communication pursuant to Article 94(3) EPC for European Application No. 16724423.5, dated Feb. 8, 2019, 5 pages.
(Continued)

*Primary Examiner* — Gregory L Huson
*Assistant Examiner* — Nikhil P Mashruwala
(74) *Attorney, Agent, or Firm* — TraskBritt

(57) ABSTRACT

The present disclosure provides a portable stove. The portable stove includes a housing having a bottom part and a cover lid part, wherein the cover lid part is hinged to the bottom part, a handle attached to the portable stove and movable between an open position and a closed position, and a locking mechanism operable by the handle, wherein the locking mechanism is configured to lock the cover lid part to the bottom part when the handle is in the closed position.

20 Claims, 31 Drawing Sheets

(58) Field of Classification Search
USPC .............................................. 126/25 R, 9 R
See application file for complete search history.

(56) References Cited

U.S. PATENT DOCUMENTS

| | | | | |
|---|---|---|---|---|
| 3,156,510 A | * | 11/1964 | Hindin ................. | A47B 67/005 |
| | | | | 108/125 |
| 3,646,928 A | | 3/1972 | Grafton et al. | |
| 4,453,529 A | | 6/1984 | Spencer et al. | |
| 5,906,196 A | * | 5/1999 | Measom ................. | F24C 3/14 |
| | | | | 108/106 |
| 6,544,096 B1 | * | 4/2003 | Pyrce .................... | A63H 33/00 |
| | | | | 206/541 |
| 7,237,548 B2 | * | 7/2007 | Mizrahi .............. | A47J 37/0704 |
| | | | | 126/25 R |
| 2006/0086351 A1 | | 4/2006 | Wilgus et al. | |
| 2012/0026827 A1 | | 2/2012 | Audette | |
| 2012/0227732 A1 | | 9/2012 | Chen et al. | |
| 2012/0266760 A1 | * | 10/2012 | Bryce .................... | A47J 33/00 |
| | | | | 99/448 |

FOREIGN PATENT DOCUMENTS

| | | | | |
|---|---|---|---|---|
| CN | 104277685 A | | 12/2014 | |
| EP | 2815853 A1 | | 12/2014 | |
| GB | 1031016 A | | 5/1966 | |
| GB | 2233547 A | | 1/1991 | |
| GB | 2483516 A | * | 3/2012 | ............. A47J 37/07 |
| JP | 3020733 U | | 2/1996 | |
| KR | 20-0160803 Y1 | | 11/1999 | |

OTHER PUBLICATIONS

Korean Notice of Grounds for Rejection for Korean Application No. 10-2017-7036792, dated Jan. 22, 2019, 16 pages.
International Search Report for International Application No. PCT/EP2016/061591 dated Jul. 7, 2016, 3 pages.
International Written Opinion for International Application No. PCT/EP2016/061591 dated Jul. 7, 2016, 5 pages.
Australian Examination Report for Australian Application No. 2016265468, dated Dec. 14, 2018, 4 pages.
Chinese Office Action and Search Report for Chinese Application No. 201680040397, dated Nov. 2, 2018, 8 pages.
Korean Notice of Final Rejection for Korean Application No. 10-2017-7036792, dated Jul. 22, 2019, 5 pages with English Translation.
Korean Written Decision on Registration for Korean Application No. 10-2017-7036792, dated Aug. 30, 2019, 2 pages with English Translation.

* cited by examiner

PORTABLE STOVE AND METHOD FOR OPERATING A LOCKING MECHANISM THEREOF

CROSS-REFERENCE TO RELATED APPLICATIONS

This application is a national phase entry under 35 U.S.C. § 371 of International Patent Application PCT/EP2016/061591, filed May 23, 2016, designating the United States of America and published in English as International Patent Publication WO 2016/185052 A1 on Nov. 24, 2016, which claims the benefit under Article 8 of the Patent Cooperation Treaty to German Patent Application Serial No. 10 2015 108 089.3, filed May 21, 2015.

TECHNICAL FIELD

Embodiments of the present disclosure relate to a portable stove and a method for operating a locking mechanism thereof. The present disclosure particularly relates to a portable stove for outdoor use.

BACKGROUND

Portable stoves can be used for outdoor cooking, for example, during camping trips or when sitting on the beach. Preparing food outdoors is becoming more and more popular. The known portable stoves can be formed like a suitcase with a cover lid part being hinged to a bottom part, i.e., the part of the portable stove accommodating a burner. Generally, the cover lid part is fixed to the bottom part when closed via specific locking means. Conventionally, elbow lever locks can be used for securing the cover lid part to the bottom part. Closing these elbow lever locks can be cumbersome. Further, elbow lever locks do not provide for a safe locking, e.g., due to wear. Thus, when carrying the stove, the stove might unintentionally open.

In view of the above, new portable stoves and methods for operating a locking mechanism thereof that overcome at least some of the problems in the art are beneficial. In particular, there is a need for an improved portable stove that provides a more secure locking in the closed state and that avoids an unintentional opening when the portable stove is carried around.

BRIEF SUMMARY

In light of the above, a portable stove and a method for operating a locking mechanism thereof are provided. Further aspects, benefits, and features of the present disclosure are apparent from the claims, the description, and the accompanying drawings.

According to an aspect of the present disclosure, a portable stove is provided. The portable stove includes a housing having a bottom part and a cover lid part, wherein the cover lid part is hinged to the bottom part, a handle attached to the portable stove and movable between an open position and a closed position, and a locking mechanism operable by the handle, wherein the locking mechanism is configured to lock the cover lid part to the bottom part when the handle is in the closed position. Thus, unintentional opening of the portable stove is prevented.

Preferably, the locking mechanism is configured to release the locking when the handle is moved into the open position.

Preferably, the locking mechanism includes at least one groove and at least one protrusion configured for engagement with the at least one groove. Preferably, the at least one protrusion and the at least one groove are configured to hold the handle in the open position and/or in the closed position.

Preferably, the locking mechanism includes at least one latching mechanism having a latch and a latching member, wherein the latch is provided at the handle and the latching member is provided at the bottom part, or vice versa. Preferably, the latch is movable by the handle into engagement with the latching member to provide for the locking, and wherein the latch is movable by the handle out of engagement with the latching member to release the locking. Preferably, the latching member is a pin member.

Preferably, the locking mechanism is configured to lock the cover lid part to the bottom part at two attachment points of the handle.

Preferably, the handle is mounted to the portable stove such that the locking is supported by the force of gravity.

Preferably, the handle is an elongated member attached to two sides of the portable stove. Preferably, the handle is mounted to the cover lid part. Preferably, the handle has a "U" shape.

Preferably, the cover lid part includes a support structure on an outer surface of the cover lid part, wherein the support structure is configured to support cookware. Preferably, the support structure is formed of at least one of a plurality of ribs and a plate. Preferably, the plurality of ribs and/or the plate are made of a wooden material.

Preferably, the stove further includes at least one wind shield configured to protect a burner against wind when the cover lid part is open. Preferably, the at least one wind shield is mounted to the cover lid part via one or more hinges.

Preferably, the stove further includes at least one standing leg configured to support the portable stove on the ground. Preferably, the at least one standing leg is removably and/or foldably mounted to the bottom part.

According to another aspect of the present disclosure, a method for operating the locking mechanism of the portable stove according to the embodiments described herein is provided. The method includes moving the handle from the open position into the closed position to lock the cover lid part to the bottom part, and/or moving the handle from the closed position into the open position to release the locking.

BRIEF DESCRIPTION OF THE DRAWINGS

So that the manner in which the above-recited features of the present disclosure can be understood in detail, a more particular description of the disclosure, briefly summarized above, may be had by reference to embodiments. The accompanying drawings relate to embodiments of the disclosure and are described in the following figures.

DETAILED DESCRIPTION

Figure 1:
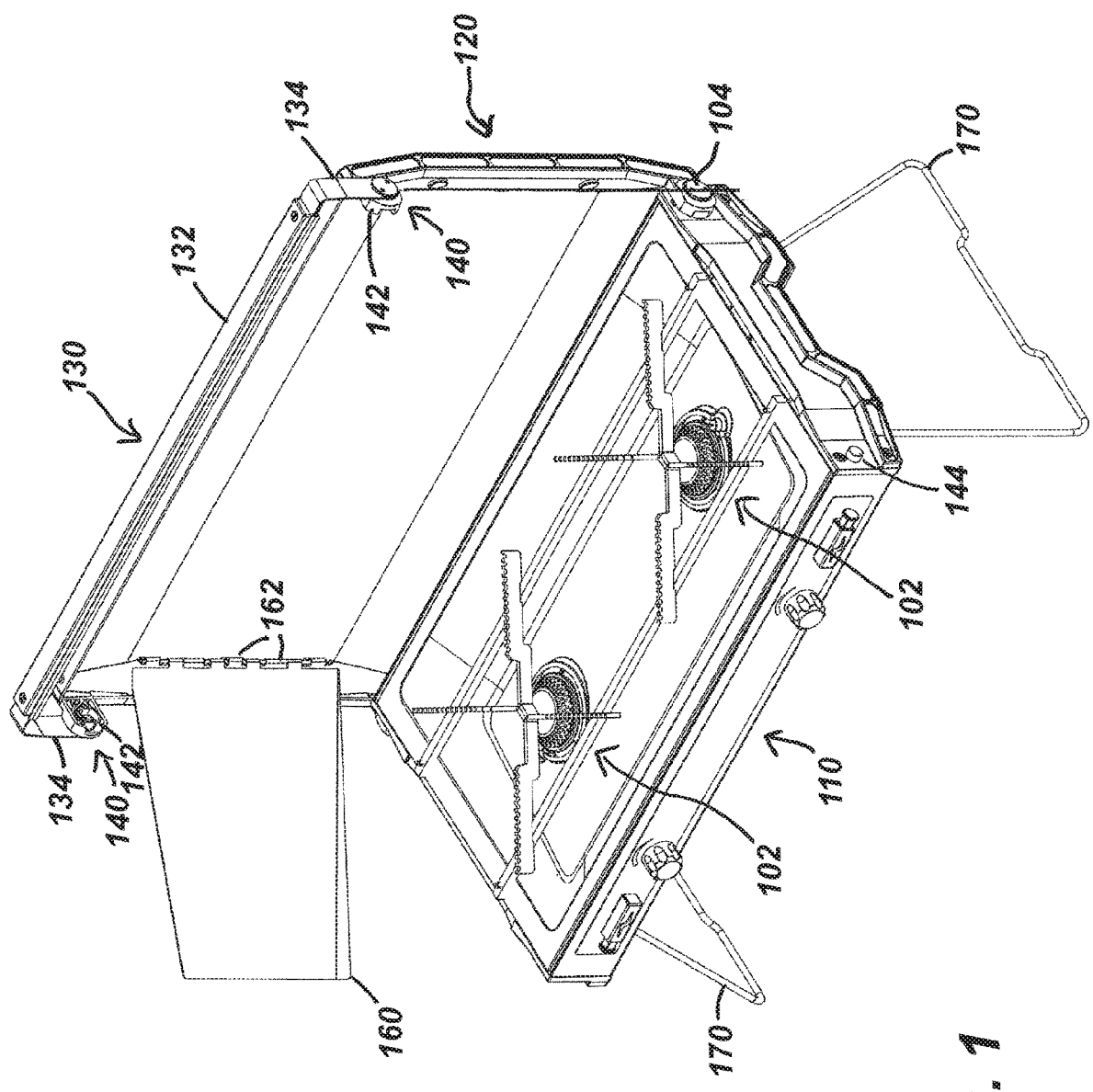
FIG. 1 shows a perspective view of a portable stove in an open state according to a first embodiment of the present disclosure.
Figure 2:
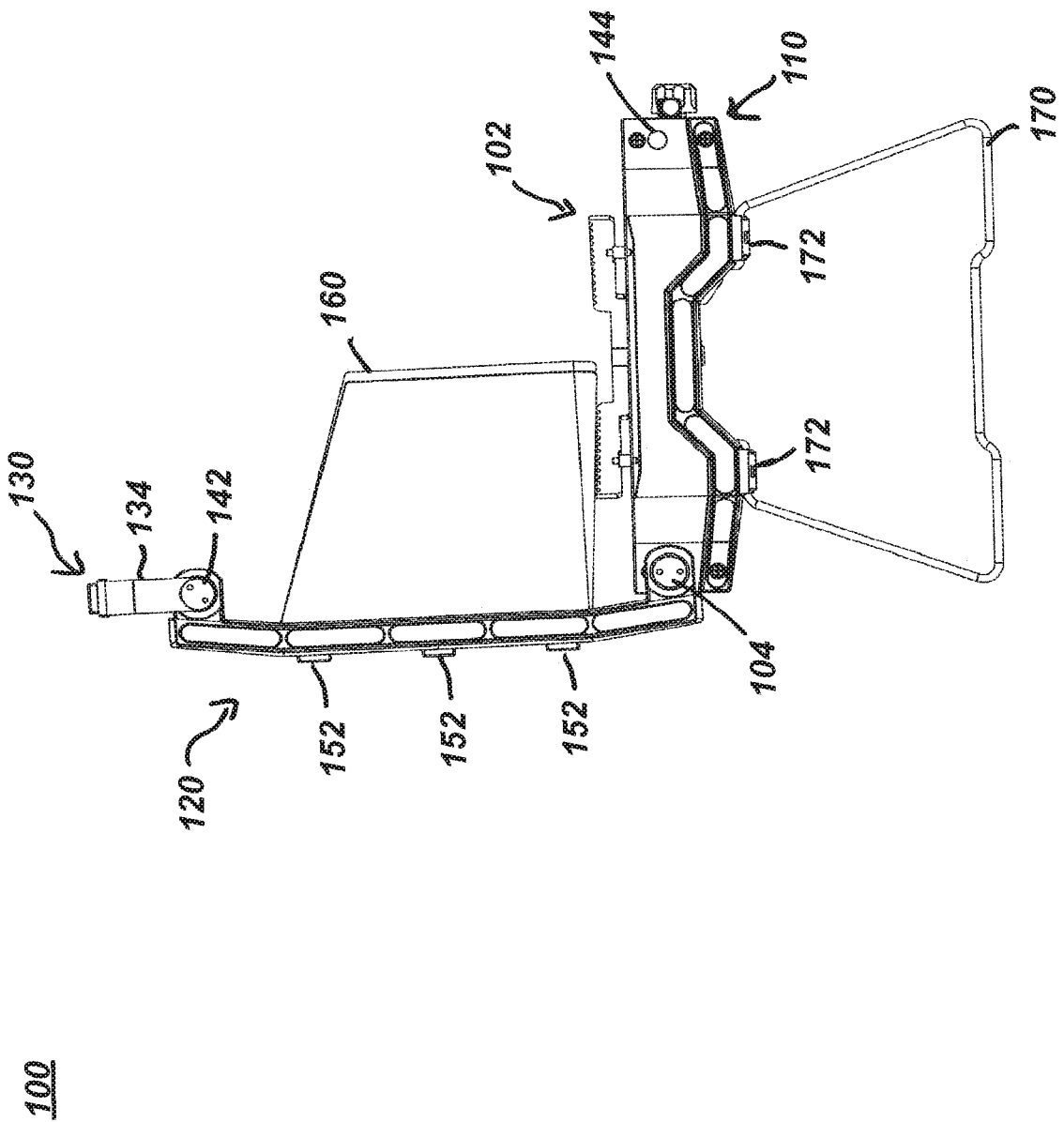
FIGS. 2 and 3 show side views of the portable stove of FIG. 1.
Figure 3:
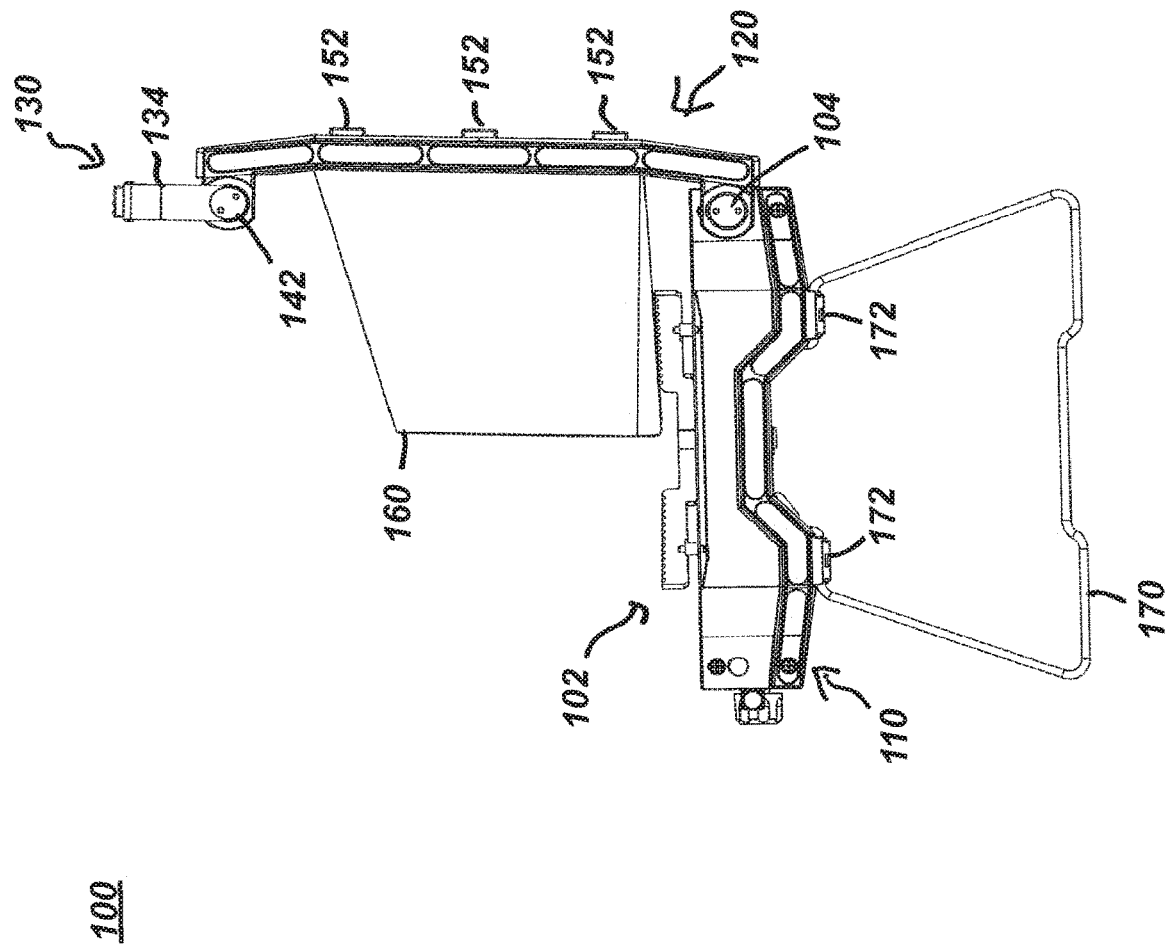
Figure 4:
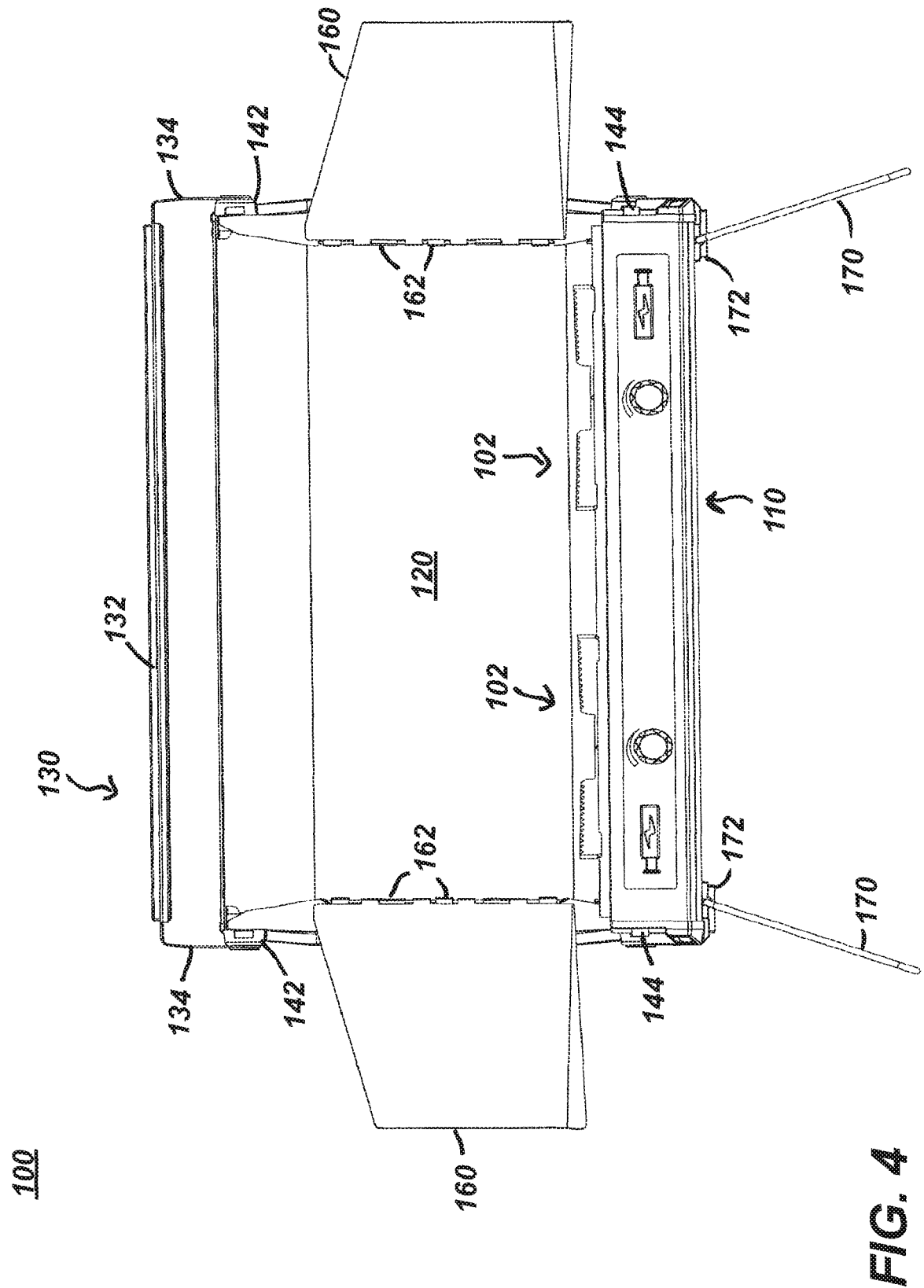
FIG. 4 shows a front view of the portable stove of FIG. 1.
Figure 5:
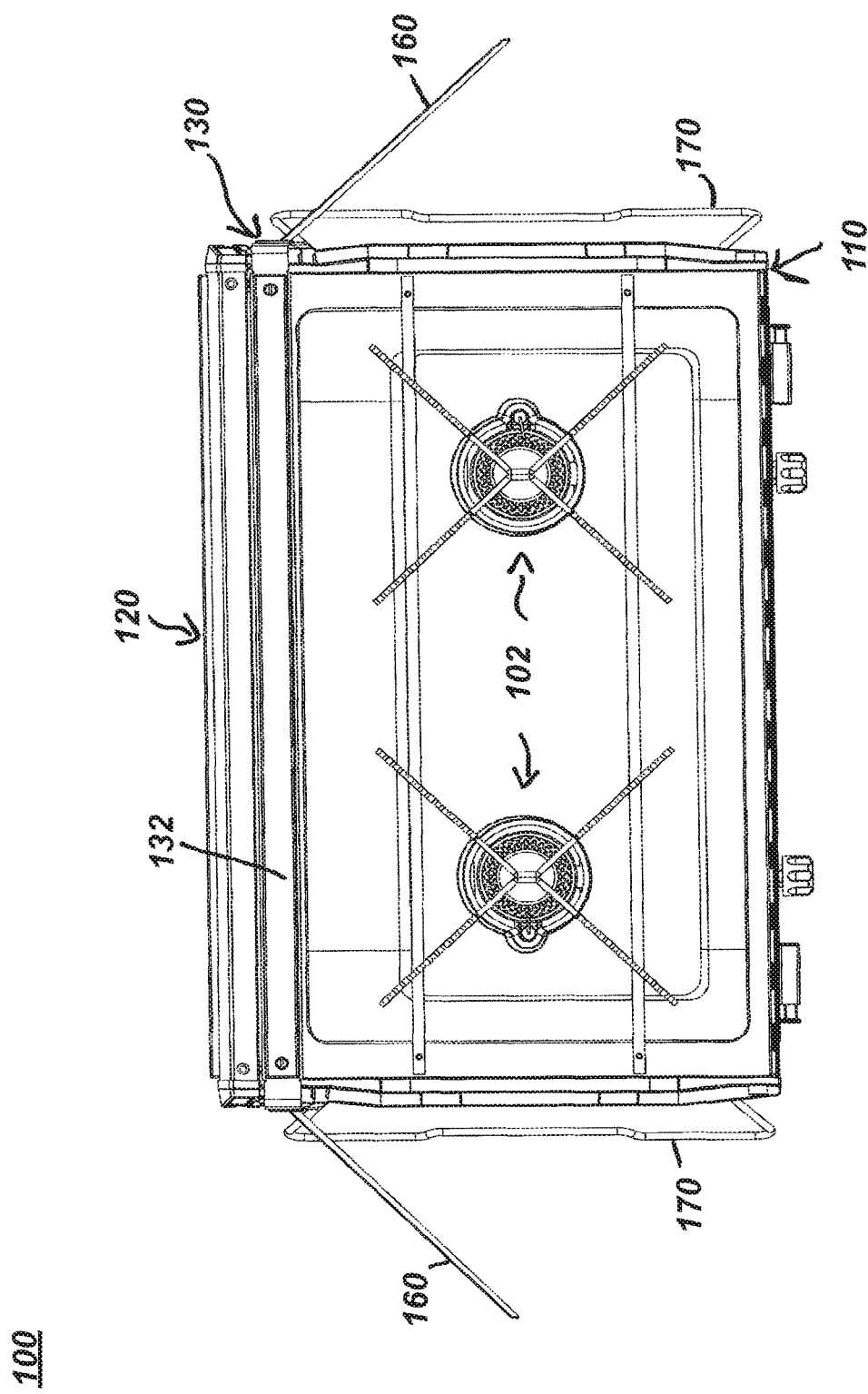
FIG. 5 shows a top view of the portable stove of FIG. 1.
Figure 6:
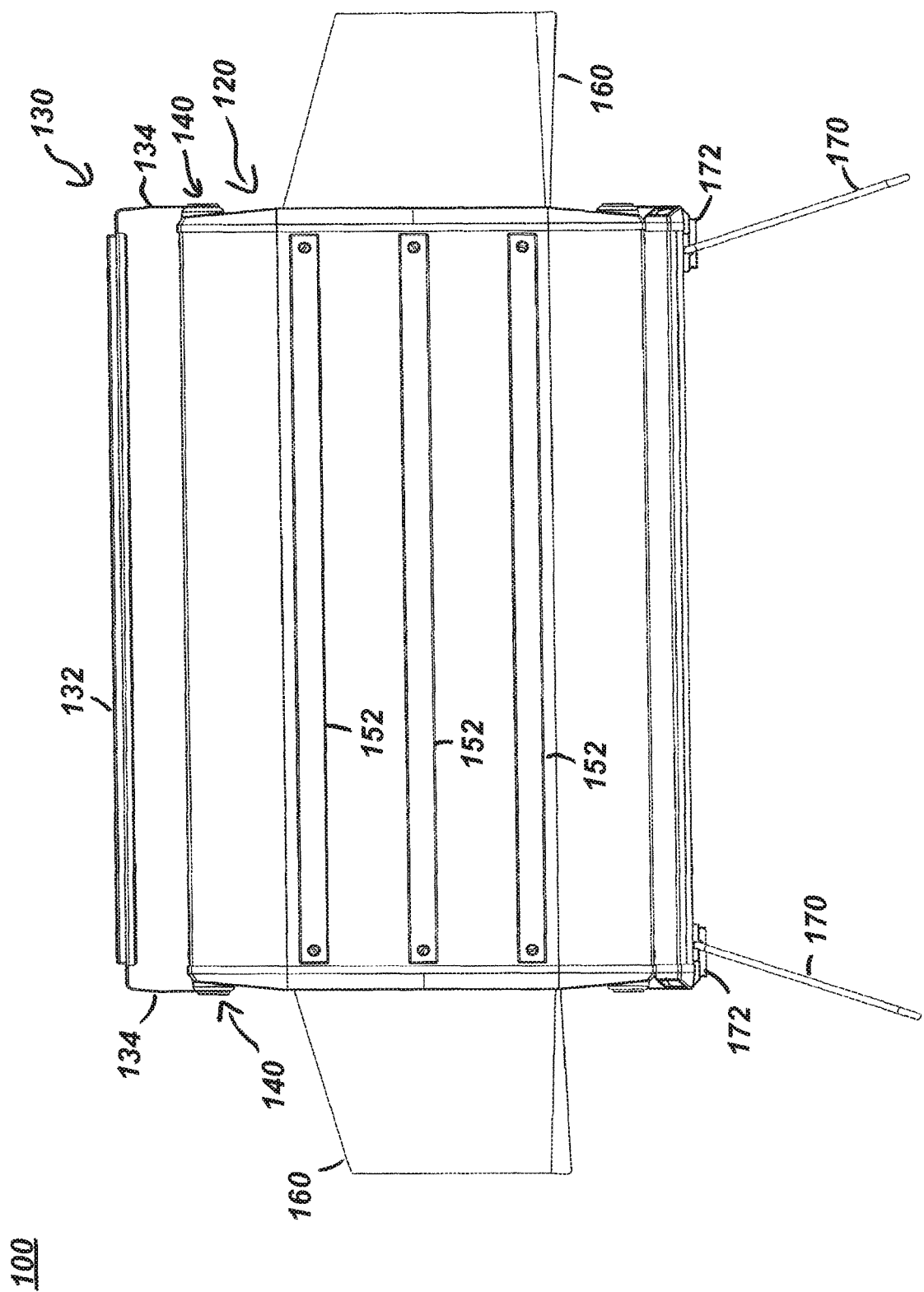
FIG. 6 shows a back view of the portable stove of FIG. 1.
Figure 7:
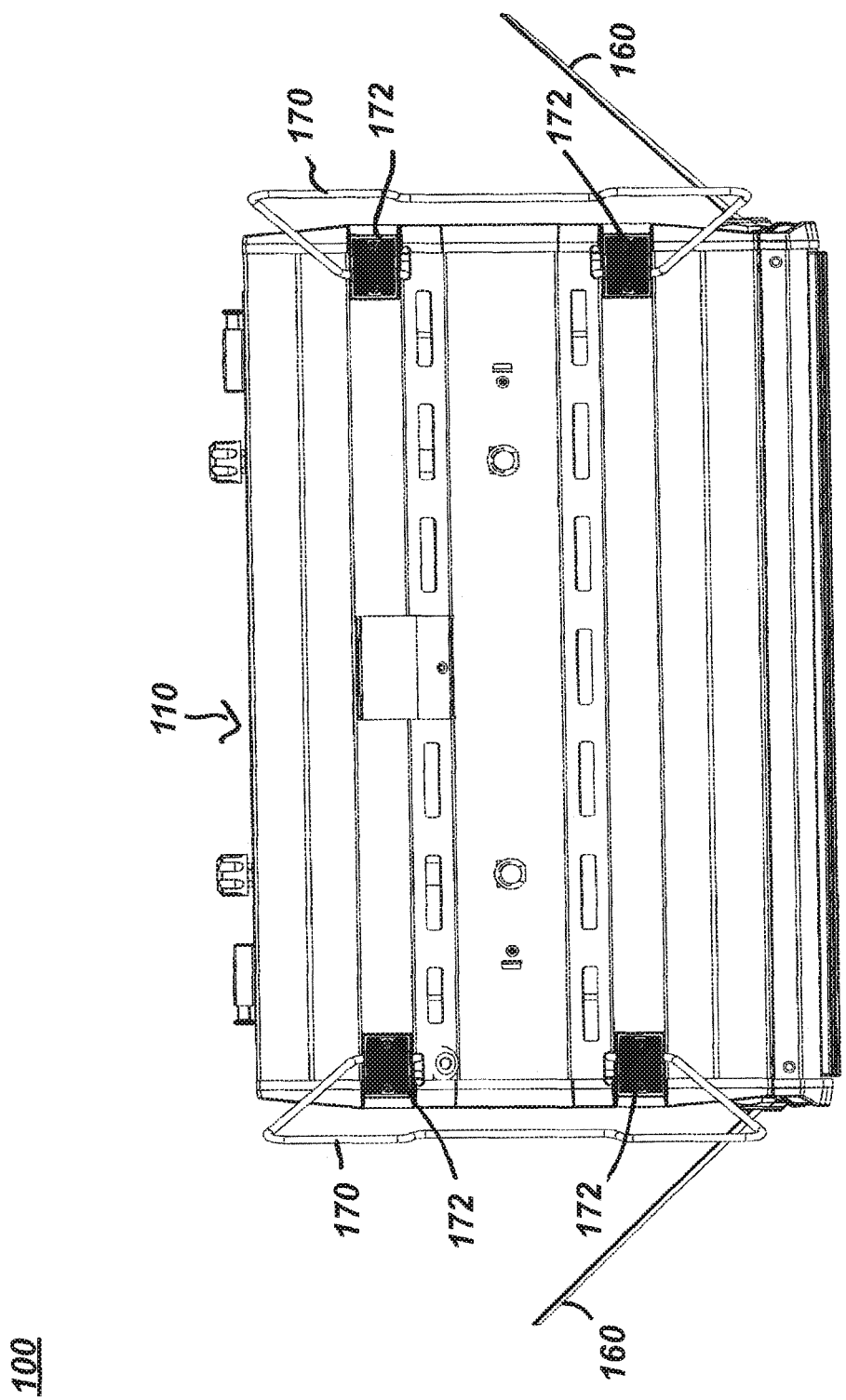
FIG. 7 shows a bottom view of the portable stove of FIG. 1.
Figure 8:
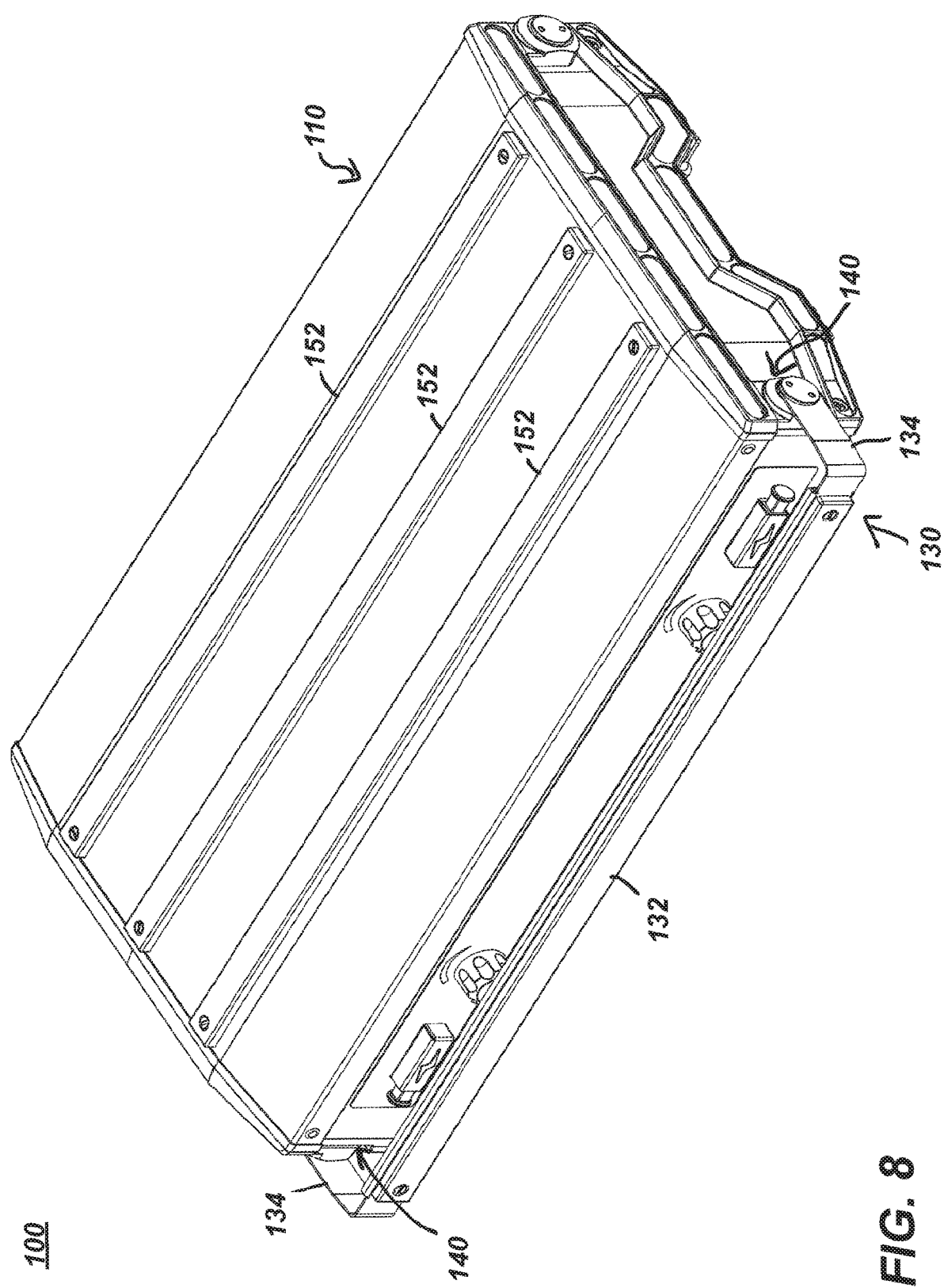
FIG. 8 shows a perspective view of the portable stove according to the first embodiment in the closed state with folded standing legs.
Figure 9:
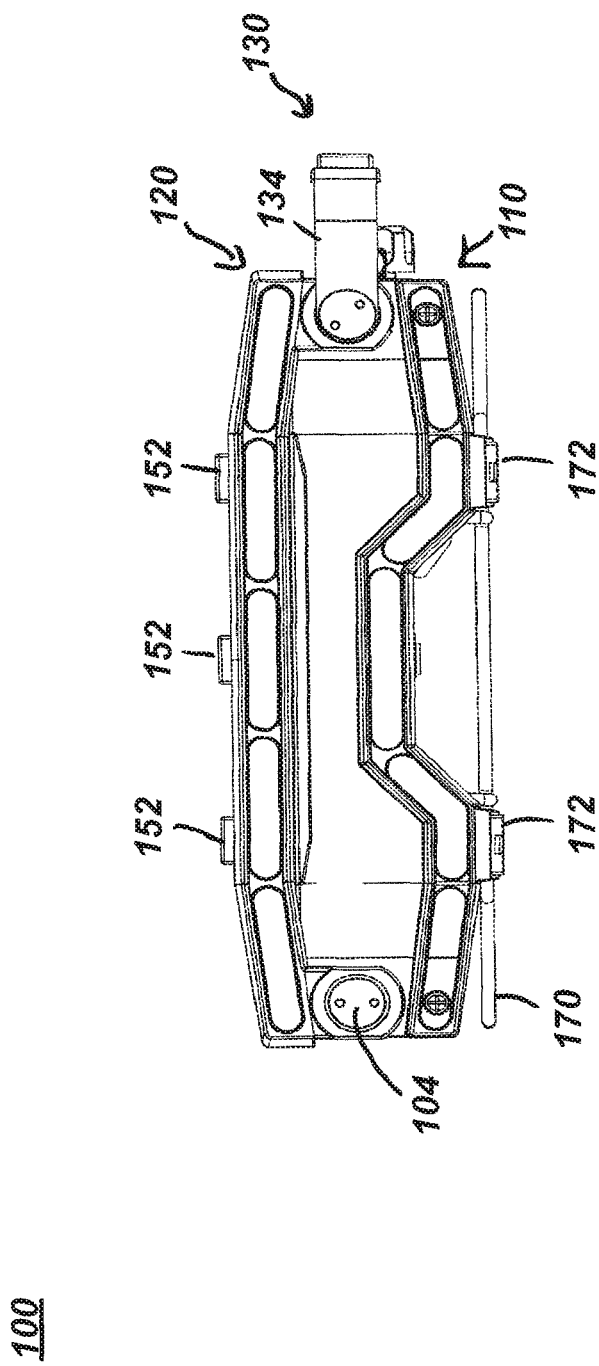
FIGS. 9 and 10 show side views of the portable stove of FIG. 8.
Figure 10:
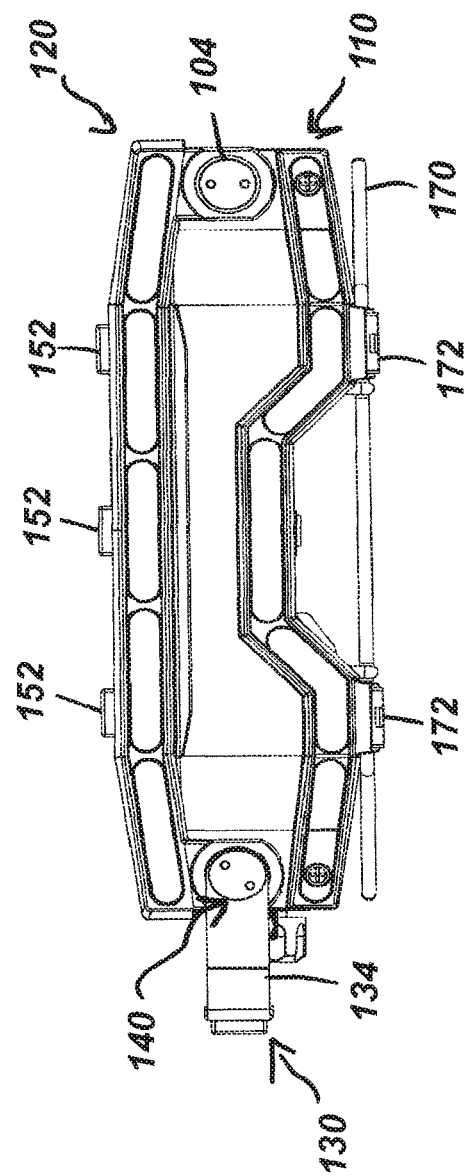
Figure 11:
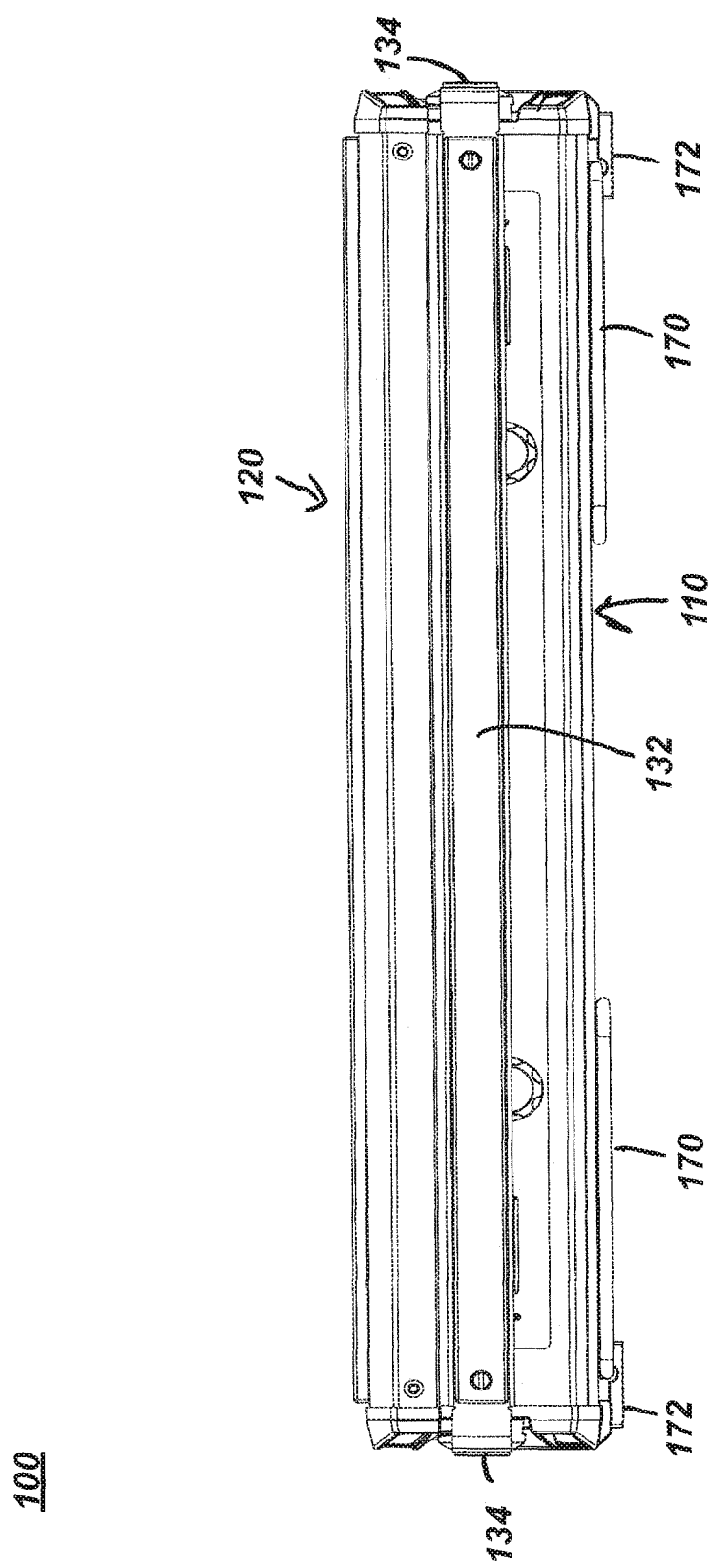
FIG. 11 shows a front view of the portable stove of FIG. 8.
Figure 12:
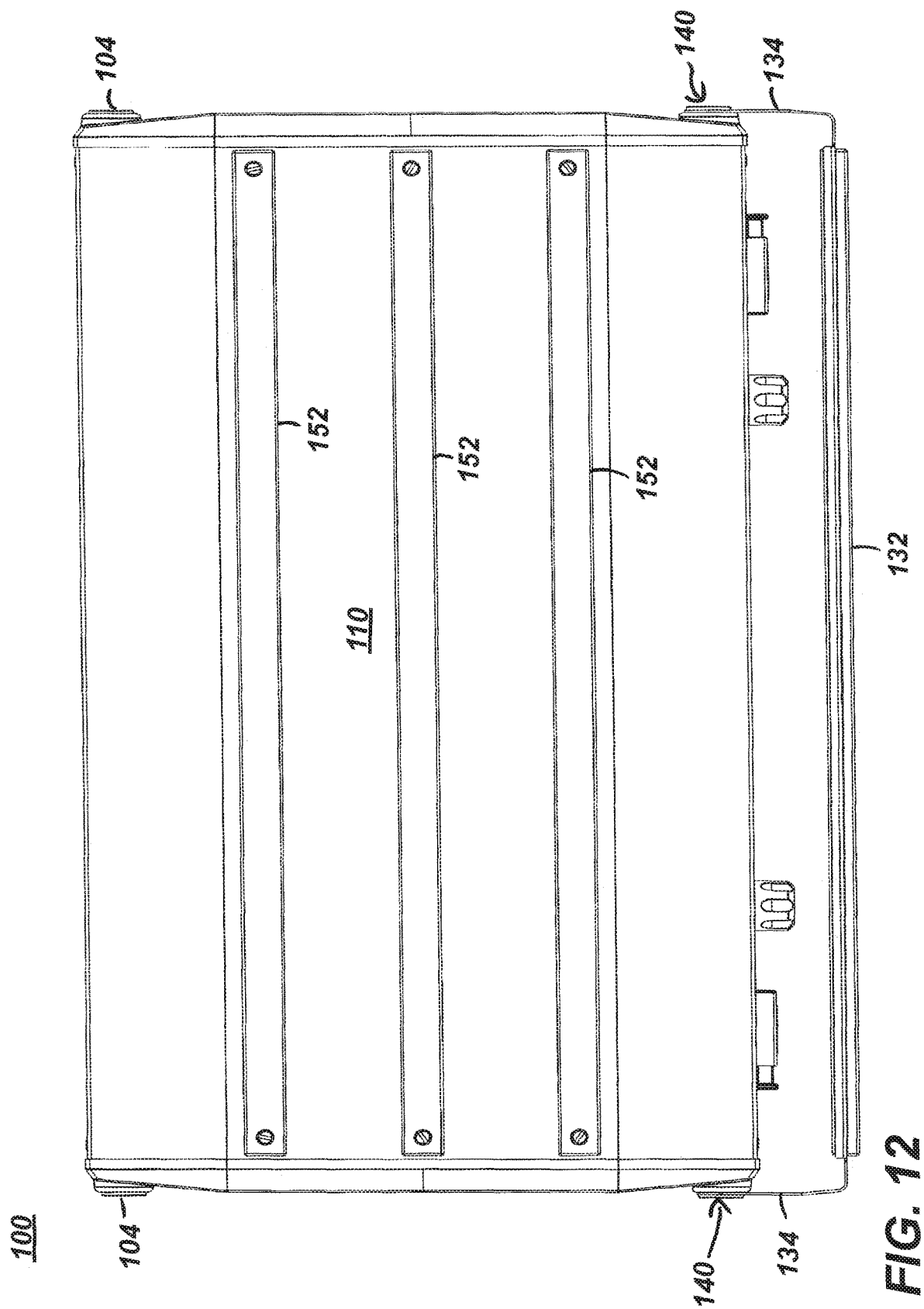
FIG. 12 shows a top view of the portable stove of FIG. 8.
Figure 13:
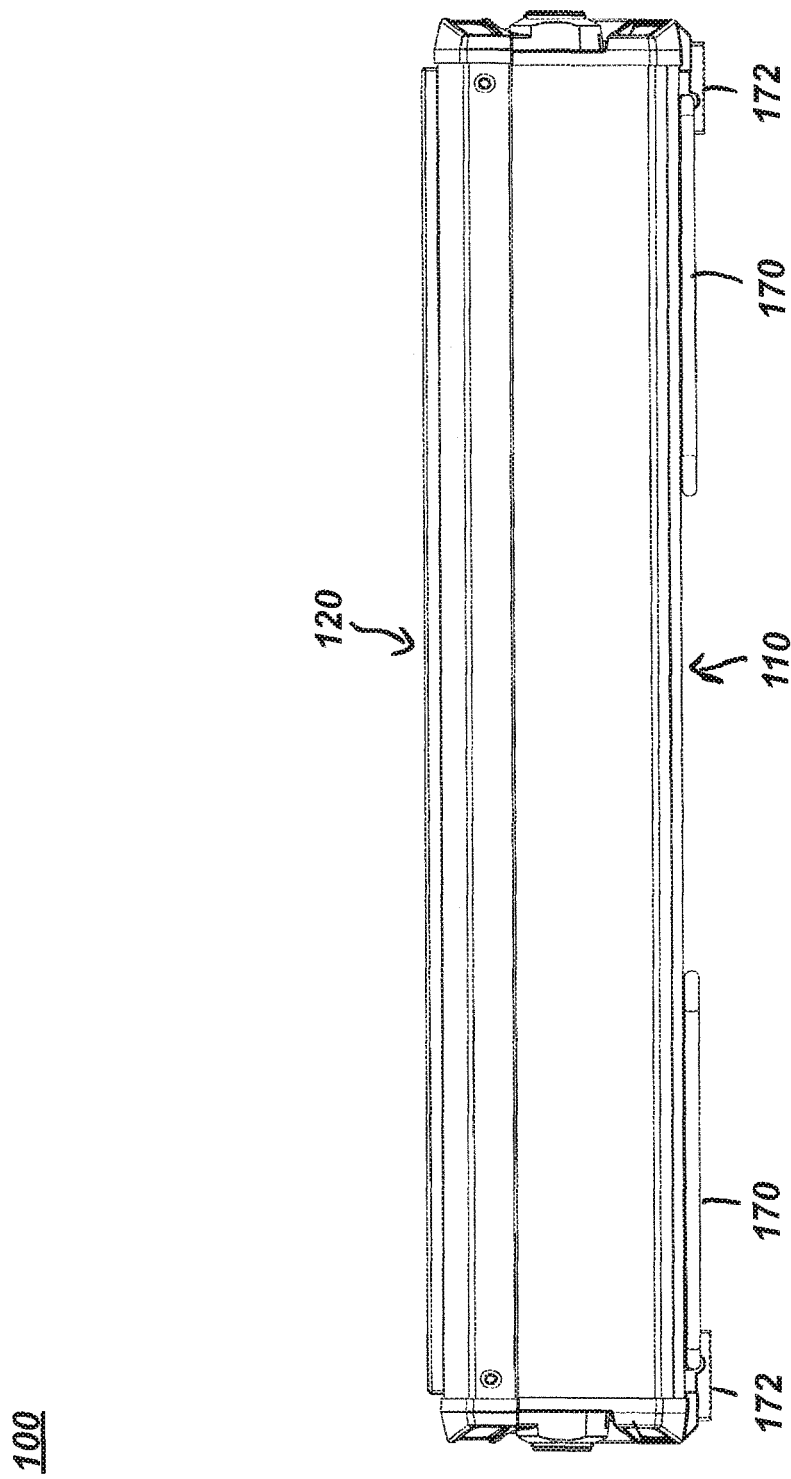
FIG. 13 shows a back view of the portable stove of FIG. 8.
Figure 14:
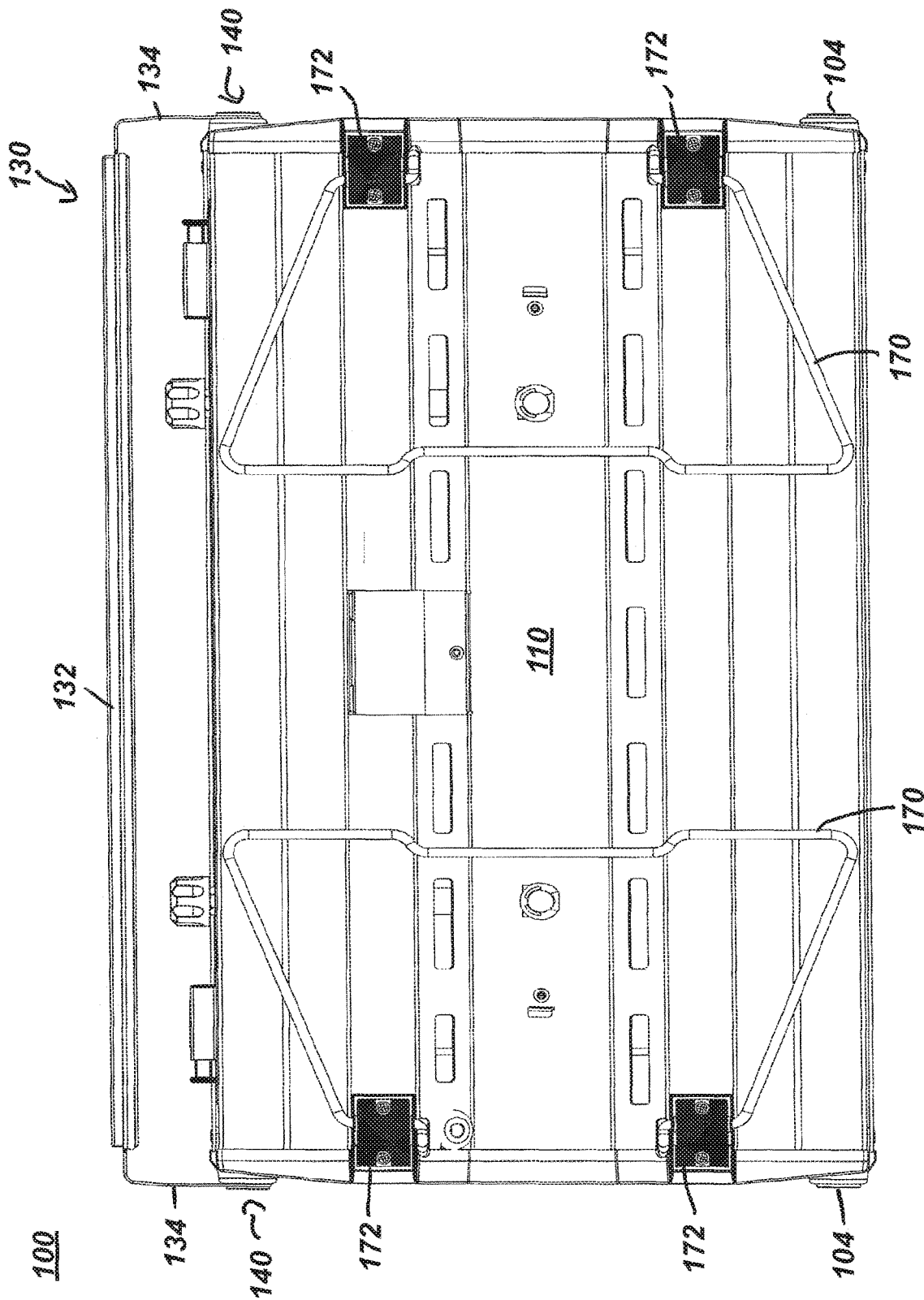
FIG. 14 shows a bottom view of the portable stove of FIG. 8.
Figure 15:
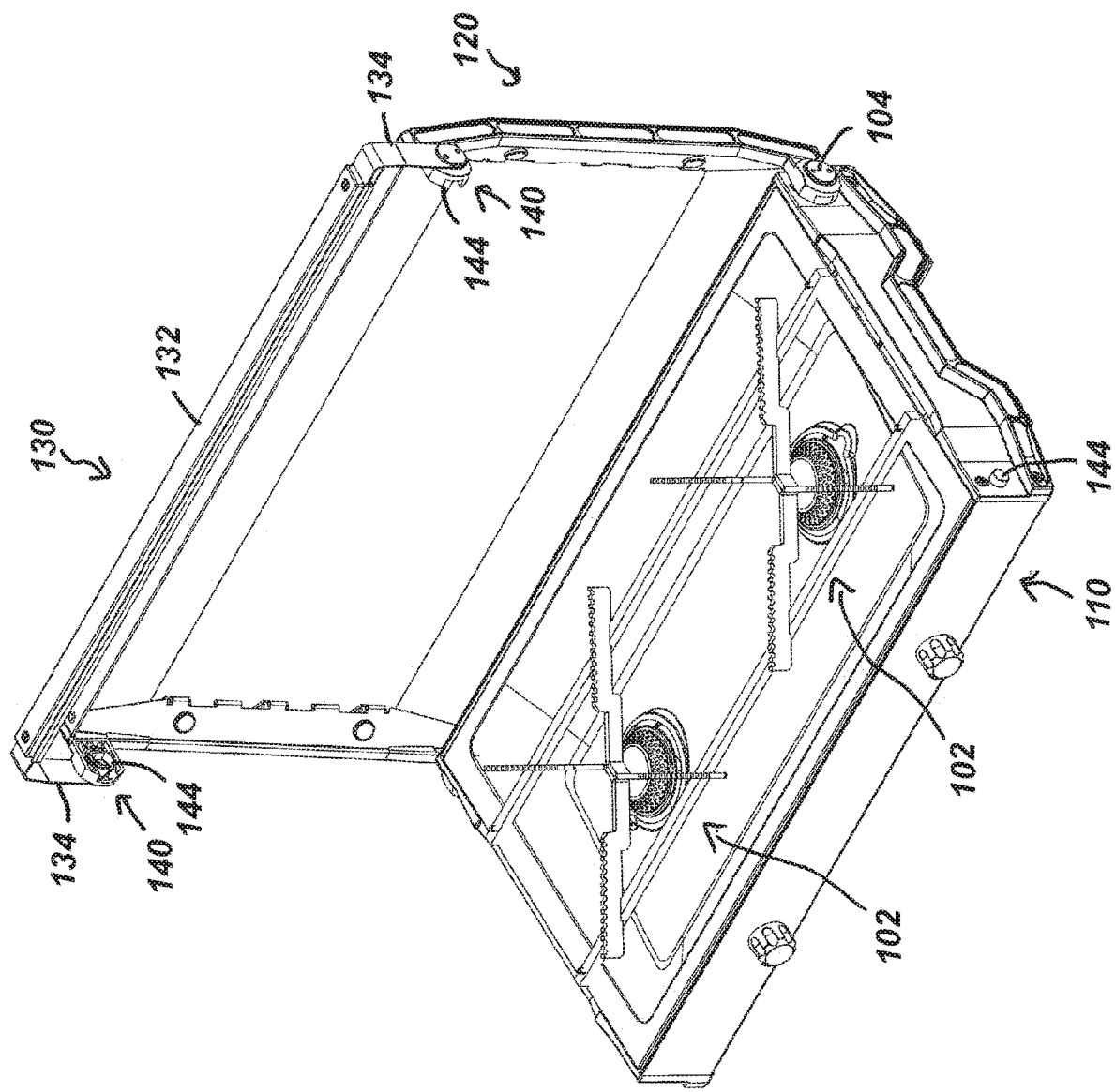
FIG. 15 shows a perspective view of a portable stove in an open state according to a second embodiment of the present disclosure.
Figure 16:
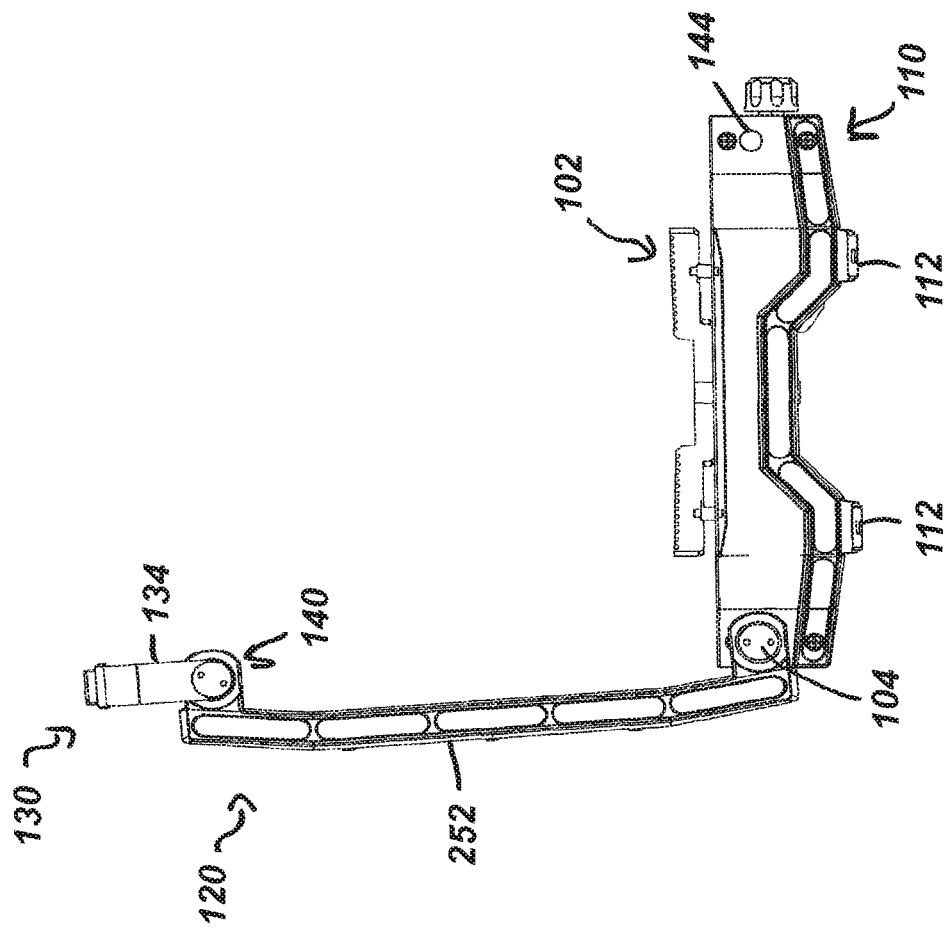
FIGS. 16 and 17 show side views of the portable stove of FIG. 15.
Figure 17:
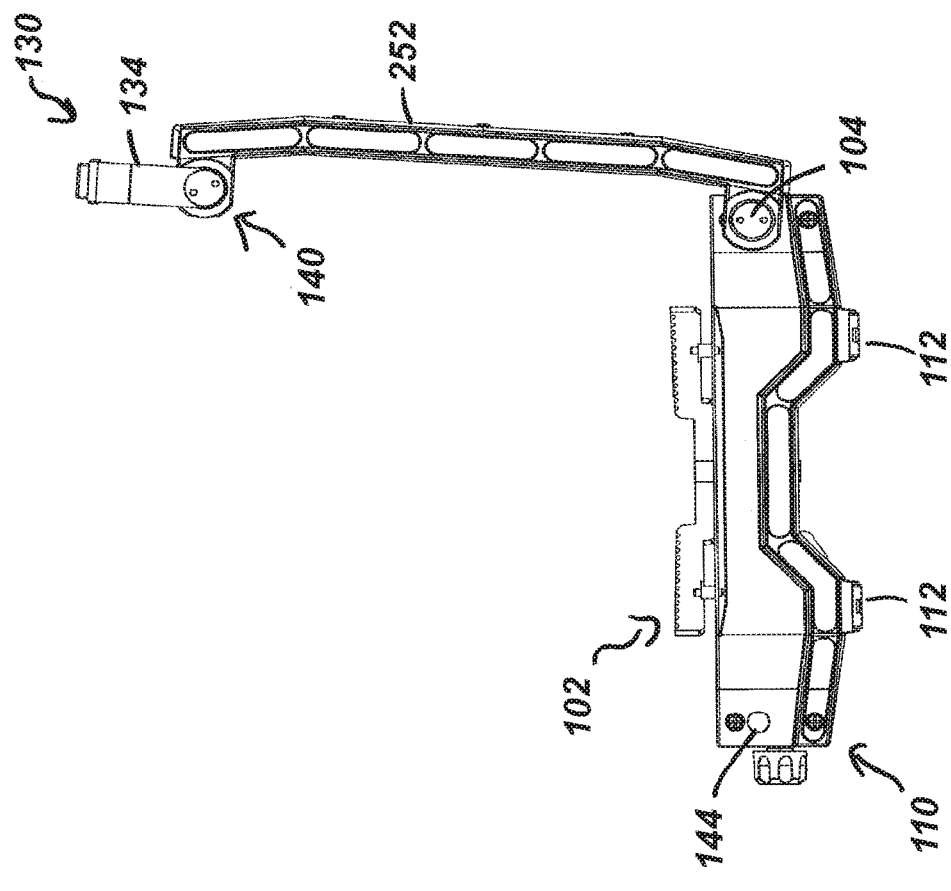
Figure 18:
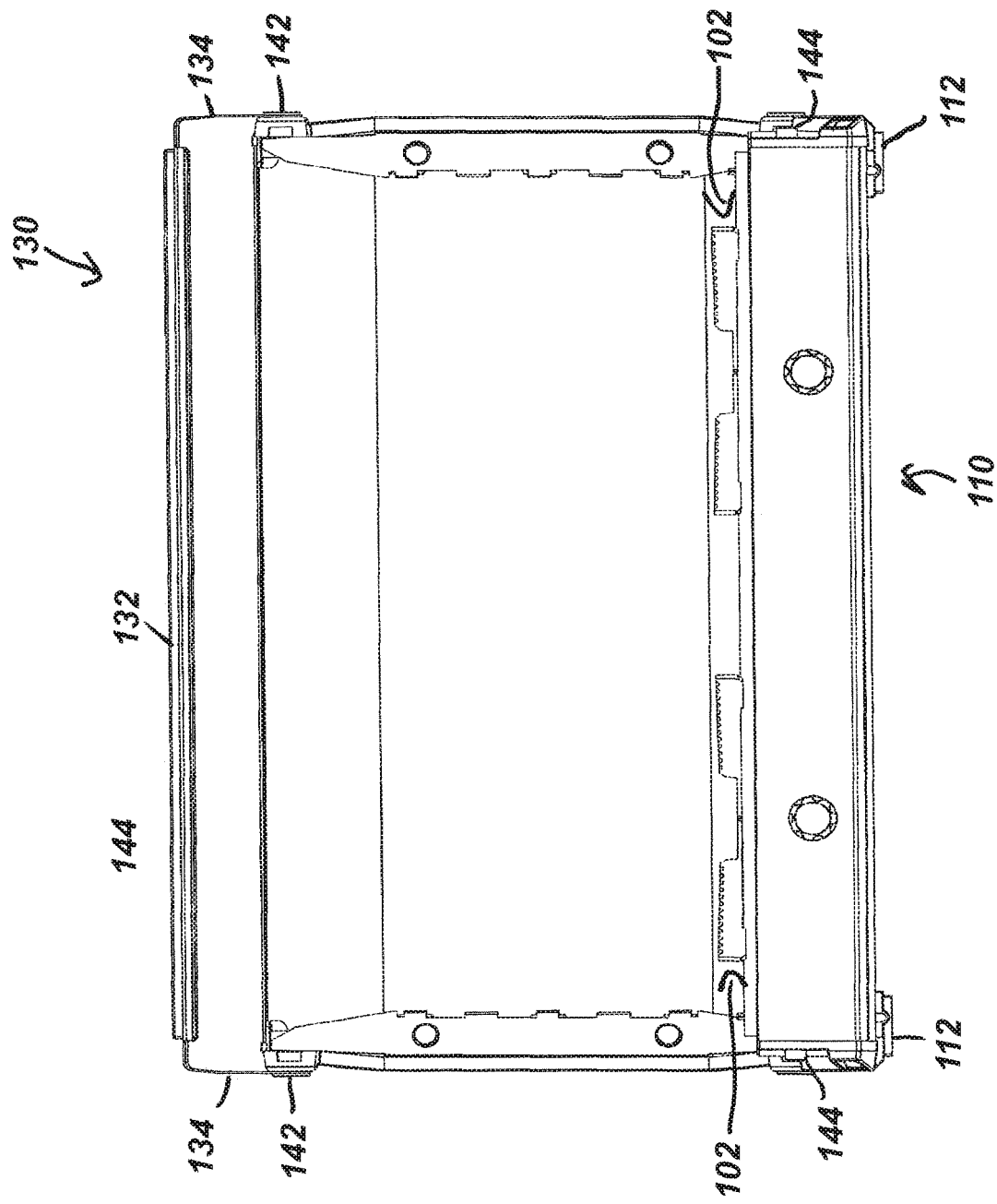
FIG. 18 shows a front view of the portable stove of FIG. 15.
Figure 19:
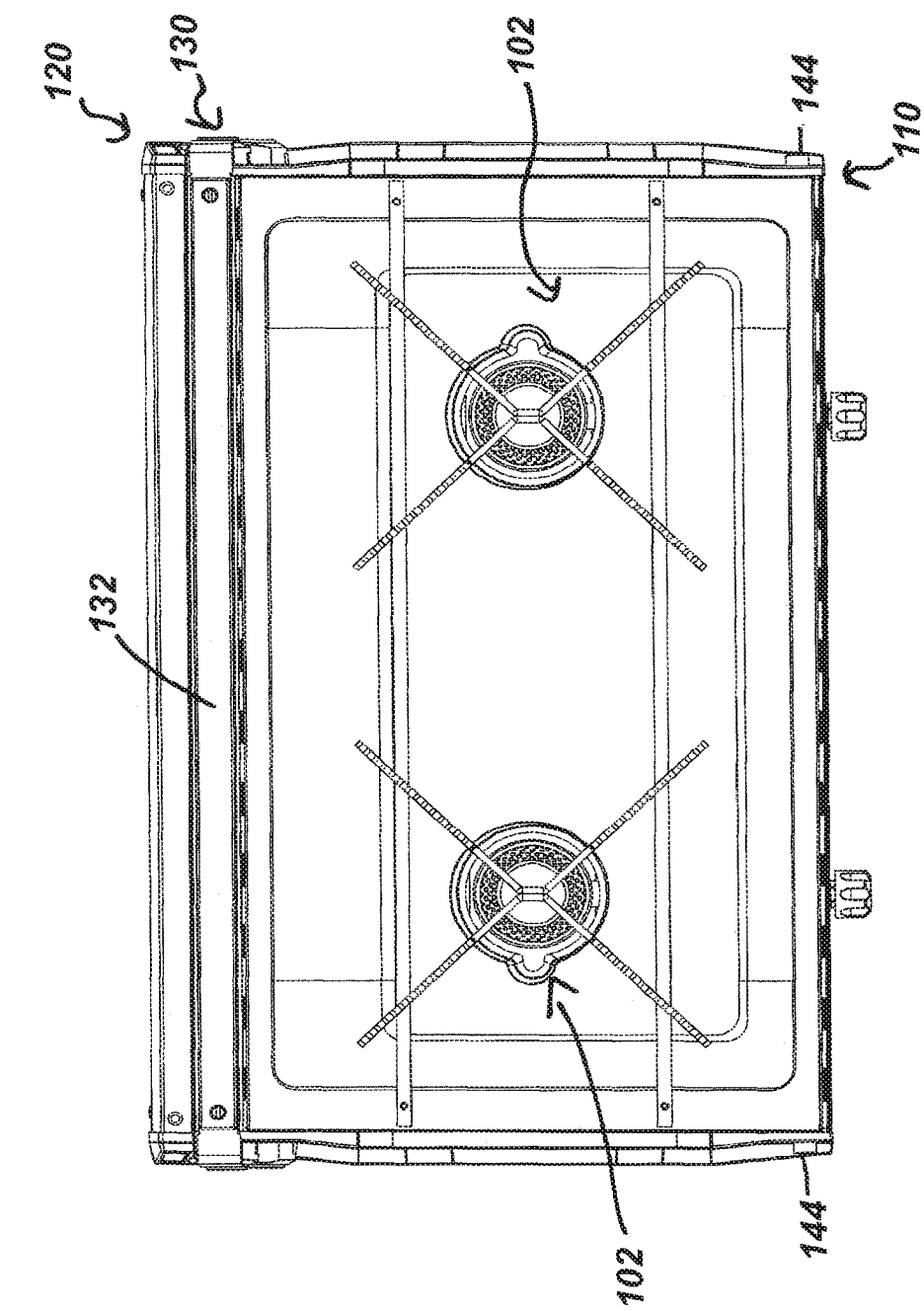
FIG. 19 shows a top view of the portable stove of FIG. 15.
Figure 20:
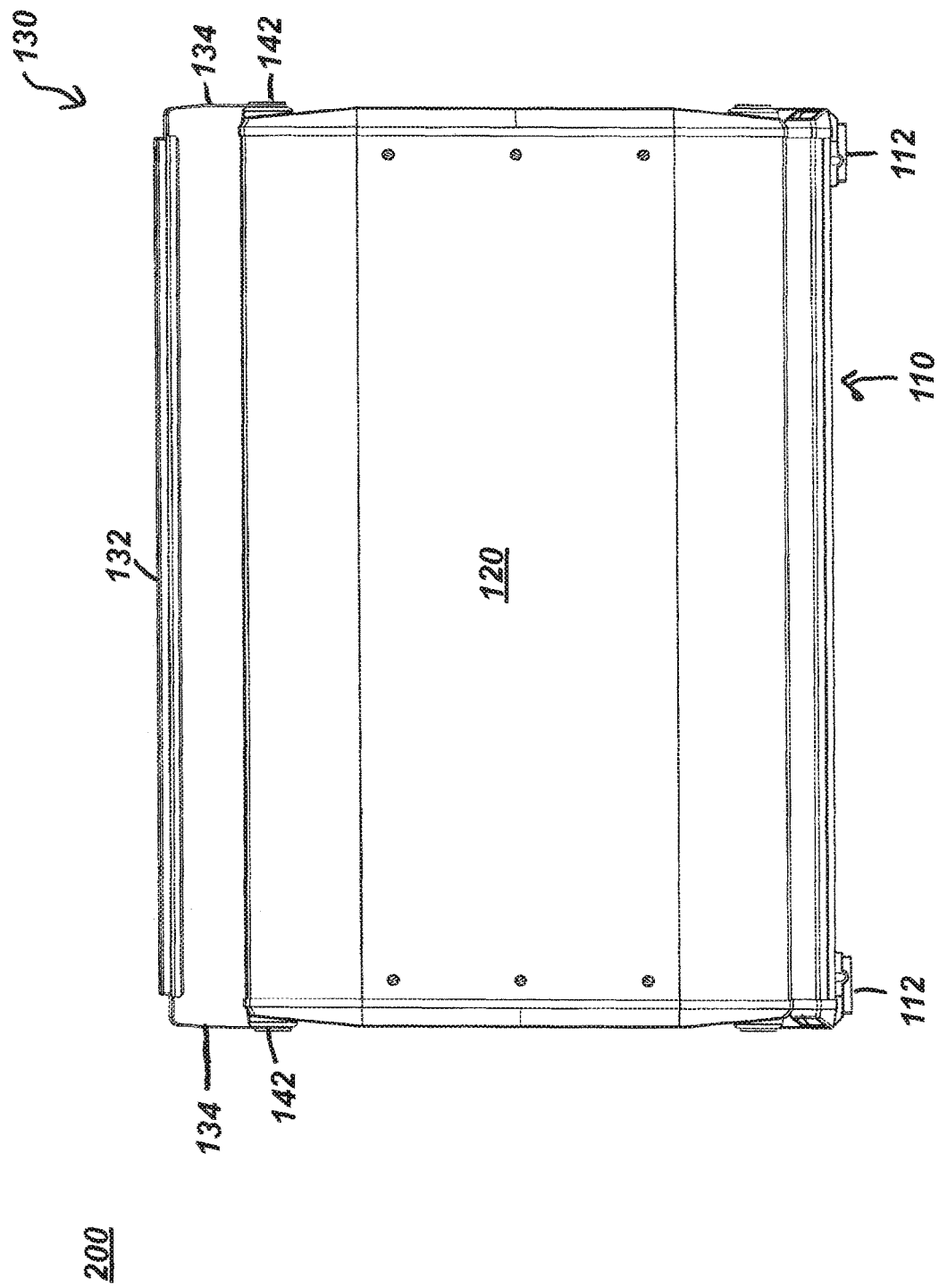
FIG. 20 shows a back view of the portable stove of FIG. 15.
Figure 21:
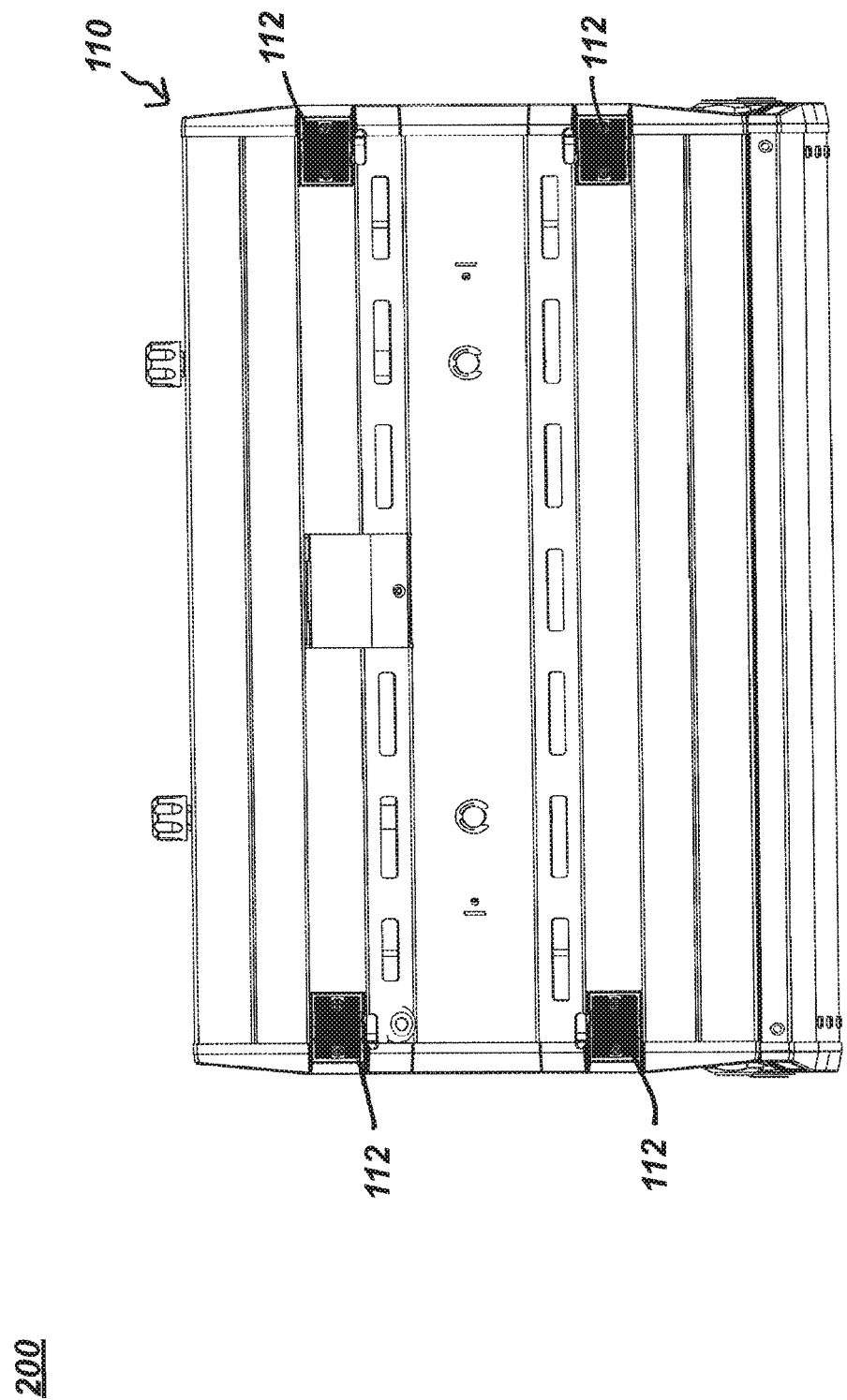
FIG. 21 shows a bottom view of the portable stove of FIG. 15.
Figure 22:
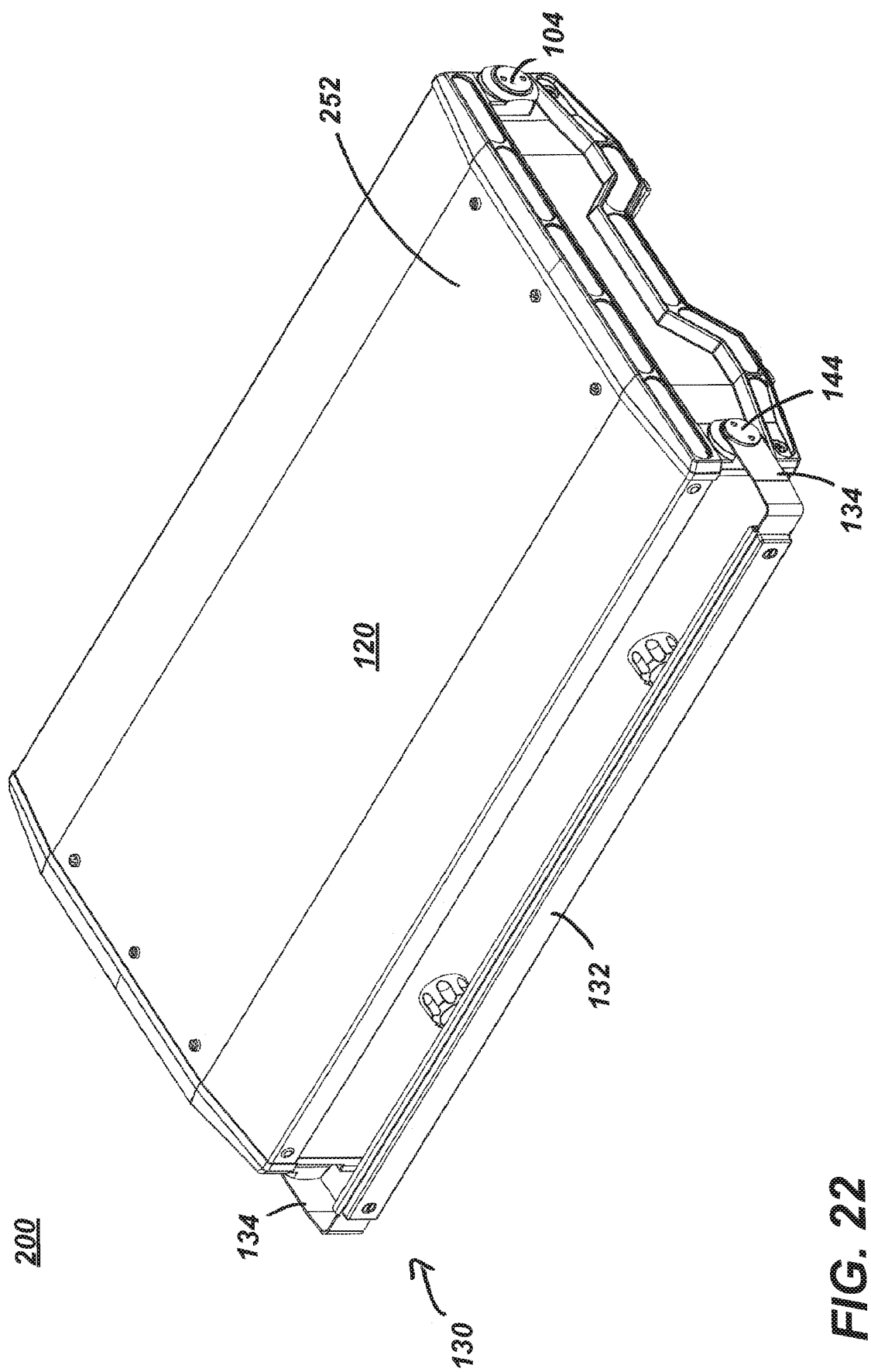
FIG. 22 shows a perspective view of the portable stove according to the second embodiment in the closed state.
Figure 23:
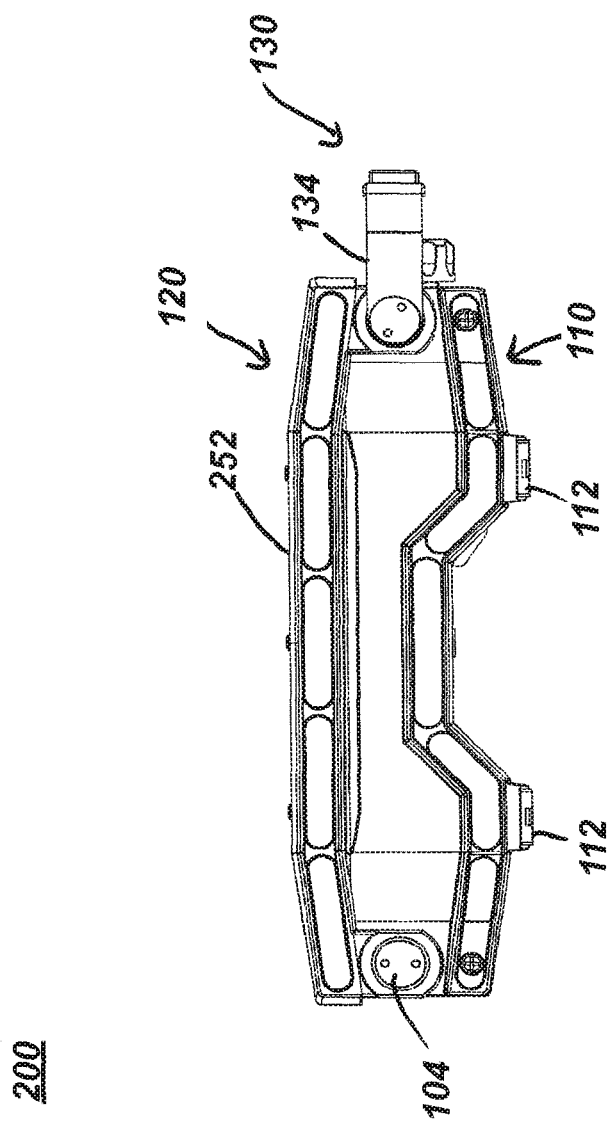
FIGS. 23 and 24 show side views of the portable stove of FIG. 22.
Figure 24:
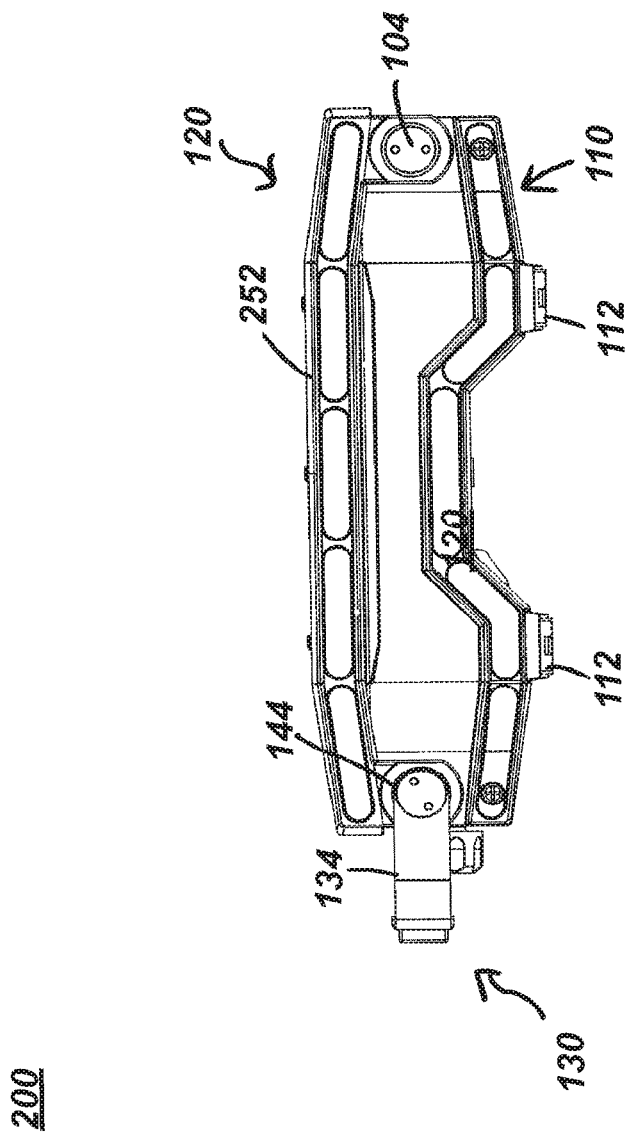
Figure 25:
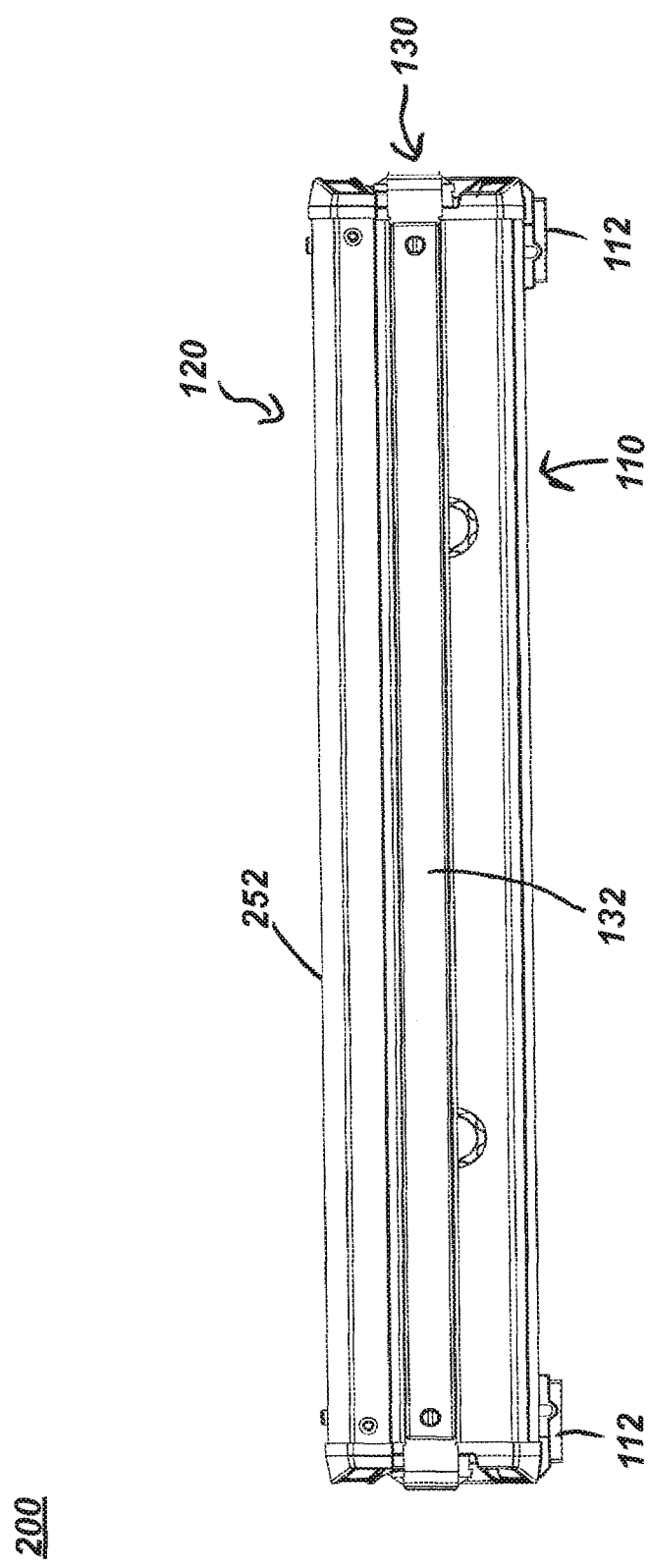
FIG. 25 shows a front view of the portable stove of FIG. 22.
Figure 26:
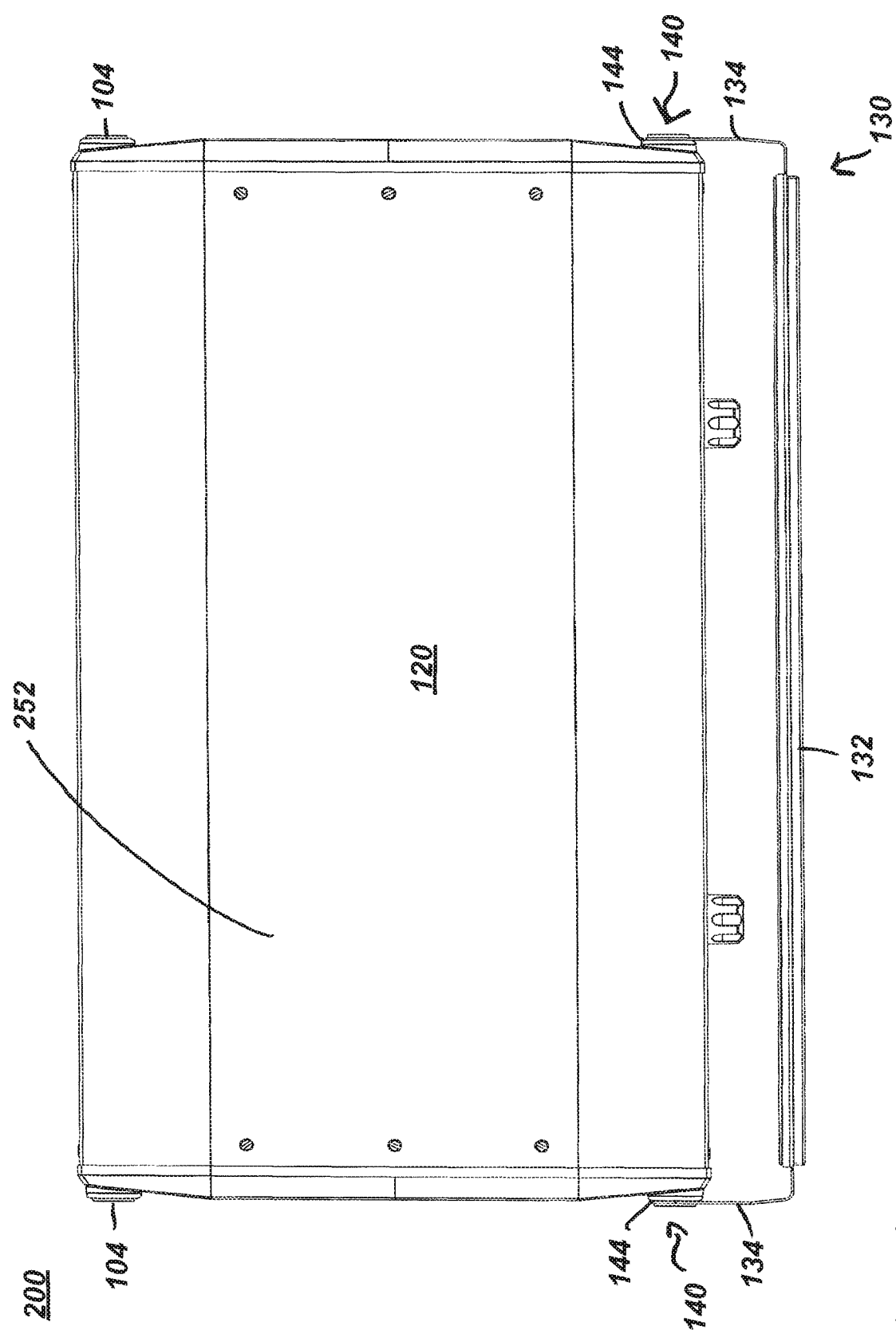
FIG. 26 shows a top view of the portable stove of FIG. 22.
Figure 27:
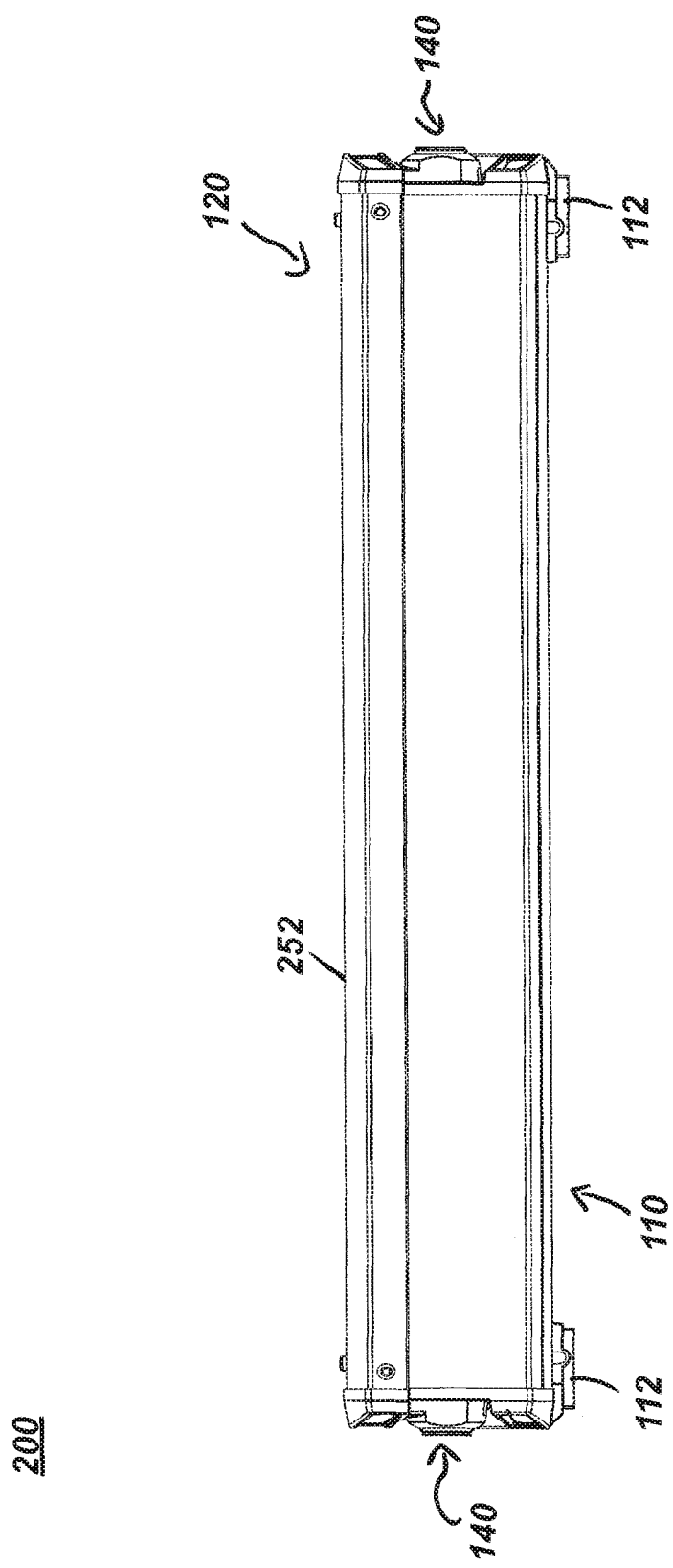
FIG. 27 shows a back view of the portable stove of FIG. 22.
Figure 28:
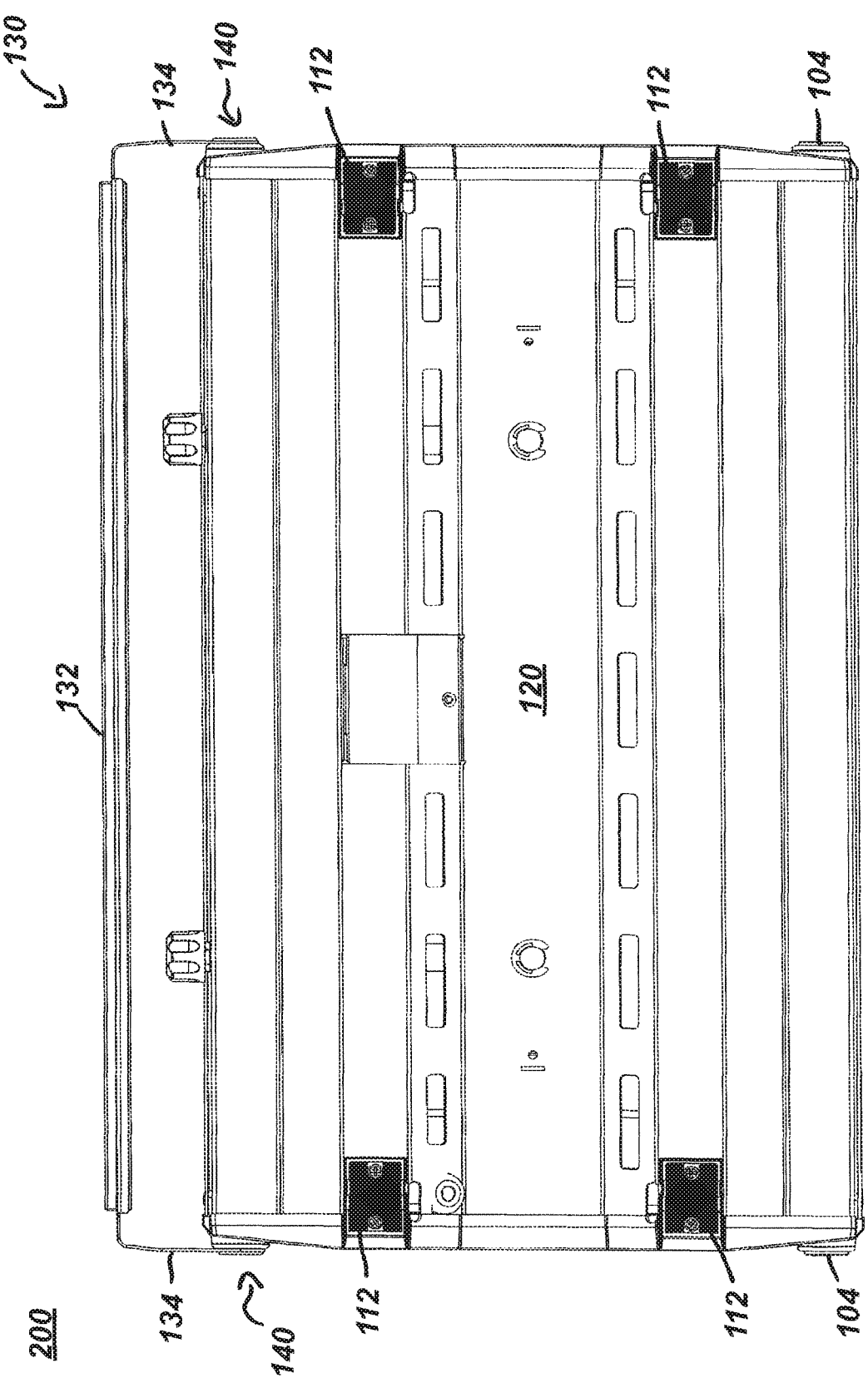
FIG. 28 shows a bottom view of the portable stove of FIG. 22.

Reference will now be made in detail to the various embodiments of the disclosure, one or more examples of which are illustrated in the figures. Within the following description of the drawings, the same reference numbers refer to the same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

In portable stoves, a cover lid part can be fixed or secured to a bottom part when closed via specific locking means. A closing of conventional locking means can be cumbersome and sometimes, these locks do not provide for a safe locking, e.g., due to wear. Thus, when carrying the stove, the stove might open unintentionally. The present disclosure provides a portable stove that provides a better locking in the closed state and avoids unintentional opening when the stove is carried around. In particular, the portable stove of the present disclosure has a handle for carrying the portable stove. The handle can additionally operate a locking mechanism for locking the cover lid part and the bottom part together. Accordingly, the handle of the portable stove has a double-function. When a user is carrying the portable stove, the handle is in the closed position, preventing a movement of the handle into the open position. An unintentional opening of the portable stove during transportation thereof can be avoided.

FIGS. 1 to 7 show schematic views of a portable stove 100 in an open state according to a first embodiment of the present disclosure. FIGS. 8 to 14 show schematic views of the portable stove 100 in a closed state according to the first embodiment of the present disclosure.

The portable stove 100 includes a housing having a bottom part 110 and a cover lid part 120, wherein the cover lid part 120 is hinged to the bottom part 110, a handle 130 attached to the portable stove 100 and movable between a first or open position and a second or closed position, and a locking mechanism 140 operable by the handle 130. The locking mechanism 140 is configured to lock the cover lid part 120 and the bottom part 110 together when the handle 130 is in the closed position. In particular, after the cover lid part 120 has been closed, the handle 130 can be moved from the open position into the closed position for locking. Likewise, the handle 130 can be moved from the closed position into the open position to release the locking. The cover lid part 120 can then be opened again. The cover lid part 120 can be hinged to the bottom part 110 using one or more hinges 104, such that the portable stove 100 can be carried around in a suitcase like manner when it is closed.

According to some embodiments, which can be combined with other embodiments described herein, the handle 130 is mounted to either the cover lid part 120 or the bottom part 110. In the example of FIGS. 1 to 14, the handle 130 is mounted to the cover lid part 120. The handle 130 can be rotatable around a rotational axis between the open position and the closed position. As an example, the handle 130 is attached to the portable stove 100, such as the bottom part 110 or the cover lid part 120, via an articulated mount. The articulated mount can be a rotary joint. The articulated mount can be part of, or integrated with, the locking mechanism 140. The articulated mount and/or the locking mechanism 140 can be configured to provide the rotational axis. The rotational axis can be a substantially horizontal rotational axis when the portable stove 100 is standing on the ground for cooking.

The rotation between the open position and the closed position can be a rotation by about 90°. When the portable stove 100 is standing on the ground, the handle 130 can be rotated around the rotational axis, which can be the substantially horizontally oriented rotational axis, in an upward direction to move the handle 130 from the closed position into the open position. Likewise, the handle 130 can be rotated in a downward direction to move the handle 130 from the open position into the closed position. However, the present disclosure is not limited thereto and the handle 130 can be rotated around the rotational axis in the upward direction to move the handle 130 from the open position into the closed position. Likewise, the handle 130 can be rotated in the downward direction to move the handle 130 from the closed position into the open position.

A movement, such as the rotation of the handle 130 operates the locking mechanism 140. The locking mechanism 140 locks or secures the cover lid part 120 to the bottom part 110, which can be a bottom lid part, when the handle 130 is in the closed position. According to some embodiments, the locking mechanism 140 is configured to release the locking of the cover lid part 120 and the bottom part 110 when the handle 130 is moved into the open position. In particular, a method for operating the locking mechanism 140 of the portable stove 100 according to the embodiments described herein can include a moving of the handle 130 from the open position into the closed position to lock the cover lid part 120 and the bottom part 110 together, and a moving of the handle 130 from the closed position into the open position to release the locking.

The handle 130 can be mounted to the portable stove 100 such that the locking is supported by the force of gravity. In particular, the portable stove 100 can be carried by a user using the handle 130 such that the locking mechanism 140 cannot be brought out of the locked state (e.g., an engagement) unintentionally. In particular, when the portable stove 100 is carried via the handle 130, the portable stove 100 can be in a substantially vertical orientation. When the portable stove 100 is standing on the ground, the portable stove 100 can be in a substantially horizontal orientation.

The term "vertical orientation" is understood to distinguish over "horizontal orientation." That is, the "vertical orientation" and the "horizontal orientation" relate to a substantially vertical orientation and substantially horizontal orientation, respectively, of the portable stove 100, wherein a deviation of a few degrees, e.g., up to 10° or even up to 15°, from an exact vertical orientation or horizontal orientation is still considered as a "substantially vertical orientation" or a "substantially horizontal orientation." The vertical direction defining the vertical orientation can be substantially parallel to the force of gravity.

According to some embodiments, which can be combined with other embodiments described herein, the handle 130 can be mounted to the portable stove 100, such as the cover lid part 120 or the bottom part 110, at one or more attachment points, such as two attachment points. As an example, the two attachment points can be provided at opposite sides of the portable stove 100, such as opposite sides of the cover lid part 120 or the bottom part 110. In particular, a first attachment point can be provided at a first side of the portable stove 100, and a second attachment point can be provided at a second side of the portable stove 100 opposite the first side. The first side and the second side can be lateral sides of the portable stove 100. In particular, a cooking area including one or more burners 102 can be provided between the first side and the second side.

A respective articulated mount, which can be part of the locking mechanism 140, can be provided at each attachment point. In particular, the articulated mount and/or the locking mechanism 140 can provide the attachment point. In other words, the articulated mount and/or the locking mechanism 140 can provide the connection between the handle 130 and the portable stove 100, such as the cover lid part 120 or the bottom part 110. In some conditions, the articulated mount can be a rotary joint.

The one or more attachment points can be provided at a side of the portable stove 100 opposite to the side where the cover lid part 120 is hinged to the bottom part 110, for example, by the one or more hinges 104. As an example, the one or more attachment points can be provided at a front side portion of the portable stove 100, i.e., the side of the portable stove 100 facing toward the user during cooking. The hinged connection between the cover lid part 120 and the bottom part 110 can be provided at a rear side portion of the portable stove 100, i.e., the side of the portable stove 100 facing away from the user during cooking.

In some implementations, the handle 130 can be an elongated member attached to two sides of the portable stove 100, i.e., at the two opposite attachment points. The handle 130 can have a "U" shape with a handle portion 132 having a first end and a second end. A respective connection portion 134 can extend from each of the first end and the second end of the handle portion 132. The connection portions 134 can be attached to the attachment points. In particular, a first connection portion can be connected to the first attachment point and a second connection portion can be connected to the second attachment point.

The locking mechanism 140 can be provided at the attachment point(s) such that the locking mechanism 140 can be operated by the handle 130. As an example, the attachment points can be provided by the locking mechanism 140. Specifically, the locking mechanism 140 can be configured to lock the cover lid part 120 and the bottom part 110 at the two attachment points of the handle 130 together. For instance, the locking mechanism 140 includes a first locking sub-mechanism and a second locking sub-mechanism. A respective locking sub-mechanism can be provided at each attachment point of the handle 130 to fasten the cover lid part 120 to the bottom part 110 at the respective attachment point. As an example, a first locking sub-mechanism can be provided at the first attachment point and a second locking sub-mechanism can be provided at the second attachment point.

According to some embodiments, which can be combined with other embodiments described herein, the locking mechanism 140 includes, or is, at least one latching mechanism having a latch 142 and a latching member 144. In one example, as illustrated in FIGS. 1 to 14, the latch 142 is provided at the handle 130 and/or the cover lid part 120, and the latching member 144 is provided at the bottom part 110. In another example (not shown), the latching member is provided at the handle 130 and/or the cover lid part 120, and the latch is provided at the bottom part 110.

The latch 142 can be provided at the attachment point of the handle 130 and can be operable by the handle 130. As an example, the latch 142 can be mechanically connected to the handle 130 such that the latch 142 can be moved by a movement of the handle 130. In particular, the latch 142 can be movably, e.g., rotatably, attached to the cover lid part 120 or the bottom part 110. In some embodiments, the latch 142 is rotatable around the rotational axis of the handle 130 by a rotation of the handle 130.

The handle 130 can be moved from the open position into the closed position to engage the latch 142 with the latching member 144. The handle 130 can be moved from the closed position into the open position to release the engagement of the latch 142 with the latching member 144. In particular, the handle 130 can be mechanically connected to the latch 142 to move or rotate the latch 142 for establishing or releasing the locking or engagement state between the latching member 144 and the latch 142. An embodiment of the latching mechanism is further explained with respect to FIGS. 29 to 31.

When the handle 130 is moved into the closed position, the latch 142 can be moved or rotated, e.g., around the rotational axis of the handle 130, into engagement with the latching member 144, thus providing the locking. When the handle 130 is moved back again into the open position, the latch 142 is moved out of engagement with the latching member 144 and the cover lid part 120 can be opened again. According to some embodiments, the latching member 144 is a pin member or a pin-like member. The latching member 144 can be attached to the other one of the cover lid part 120 or the bottom part 110 to which the latch 142 is mounted, e.g., depending on the mount of the handle 130.

In some implementations, the locking mechanism 140 includes a first locking sub-mechanism, such as a first latching mechanism, and a second locking sub-mechanism, such as a second latching mechanism. Each of the first latching mechanism and the second latching mechanism can include a respective latch 142 and a respective latching member 144. The latching mechanism(s) can be provided at the attachment point(s) of the handle 130 such that the latching mechanism(s) can be operated by the handle 130. Specifically, the latching mechanism(s) can be configured to lock the cover lid part 120 and the bottom part 110 together at the two attachment points of the handle 130.

In some embodiments, a respective latching mechanism can be provided at each attachment point of the handle 130 to secure the cover lid part 120 to the bottom part 110 at the respective attachment point(s). As an example, the first latching mechanism can be provided at the first attachment point and the second latching mechanism can be provided at the second attachment point. The first attachment point and the second attachment point can be provided at the opposite sides of the portable stove 100, such as the opposite sides of the cover lid part 120.

According to some embodiments, which can be combined with other embodiments described herein, the locking mechanism 140 includes at least one groove and at least one protrusion (or nose) configured for engagement with the at least one groove. As an example, a protrusion can snap into a respective groove to hold the handle 130 in its position. In particular, the at least one protrusion and the at least one groove can be configured to hold the handle 130 in the open position and/or in the closed position. In some implementations, two grooves can be provided. A first groove of the two grooves can be configured for engagement with the at least one protrusion to hold the handle 130 in the open position. A second groove of the two grooves can be configured for engagement with the at least one protrusion to hold the handle 130 in the closed position. Accordingly, an unintentional movement of the handle 130 can be avoided. However, the present disclosure is not limited thereto and, in the above example, the at least one groove can be replaced by the at least one protrusion and the at least one protrusion can be replaced by the at least one groove. Specifically, a first protrusion and a second protrusion can be provided for engagement with the at least one groove to hold the handle 130 in the open position and the closed position.

The at least one protrusion and the at least one groove can be provided at different positions and/or elements of the portable stove 100 for preventing a relative movement between the handle 130 and the cover lid part 120 when the at least one protrusion and the at least one groove are in engagement. Accordingly, the engagement between the one or more protrusions and a respective groove can lock a relative position of the handle 130 with respect to the cover lid part 120.

In some implementations, the cover lid part 120 can include a support structure on an outer surface of the cover lid part 120. The outer surface of the cover lid part 120 can be a surface that is not facing the bottom part 110 when the portable stove 100 is in the closed state. The support structure can be configured to support cookware. In some embodiments, the support structure is formed of at least one of a plate and a plurality of ribs 152. In the first embodiment described with respect to FIGS. 1 to 14, the support structure is provided by the plurality of ribs 152. The cookware can be placed on the support structure, e.g., the plurality of ribs 152, after preparing a meal in a convenient and appealing way. The support structure, such as the plate and/or the plurality of ribs 152, can be made of a wooden material, such as oak. In particular, the plurality of ribs 152 can be provided as oak laths.

According to some embodiments, which can be combined with other embodiments described herein, the portable stove 100 includes at least one wind shield 160 configured to protect the one or more burners 102 of the portable stove 100, e.g., against wind when the cover lid part 120 is open. As an example, one wind shield 160 can be provided at each lateral side of the portable stove 100. The at least one wind shield 160 can be mounted to the cover lid part 120 via one or more hinges 162. Providing the one or more hinges 162 allows storage of the at least one wind shield 160 within the portable stove 100 when the portable stove 100 is in the closed state. Optionally, the at least one wind shield 160 may be mounted only to the cover lid part 120 such that a handling of the at least one wind shield 160 is facilitated.

According to some embodiments, which can be combined with other embodiments described herein, the portable stove 100 includes at least one standing leg 170 configured to support the portable stove 100 on the ground. The at least one standing leg 170 can be mounted to the bottom part 110. As an example, the at least one standing leg 170 can be mounted to the surface of the bottom part 110 facing the ground when the portable stove 100 is standing on the ground. Two, three or four standing legs can be provided. As an example, two standing legs can be provided at opposite sides of the bottom part 110 such that the portable stove 100 can be kept in a stable position even during use.

The at least one standing leg 170 can be removably or foldably mounted to the bottom part 110. As an example, one or more articulated mounts 172 can be provided for connecting the at least one standing leg 170 to the bottom part 110. The at least one standing leg 170 can be extended such that the portable stove 100 can be placed on the ground, as it is shown in FIGS. 1 to 7. The at least one standing leg 170 can be retracted or folded when the portable stove 100 is in the closed state to be carried around, as it is shown in FIGS. 8 to 14.

According to some embodiments, the one or more articulated mounts 172 are configured to fix or secure a position of the at least one standing leg 170 in the folded (e.g., extended) and/or in the unfolded (e.g., retracted) position. As an example, at least one groove and at least one protrusion can be provided similar to the grooves and protrusions described with respect to the latching mechanism in order to fix the position of the at least one standing leg 170.

FIGS. 15 to 21 show schematic views of a portable stove 200 in an open state according to a second embodiment of the present disclosure. FIGS. 22 to 28 show schematic views of the portable stove 200 in a closed state according to the second embodiment of the present disclosure. The portable stove 200 of the second embodiment is similar to the portable stove of the first embodiment, and a description of similar or identical aspects is not repeated.

The cover lid part 120 of the portable stove 200 includes the support structure on the outer surface of the cover lid part 120, e.g., the surface that is not facing the bottom part 110 when the portable stove 200 is in the closed state. The support structure can be configured to support cookware. In some embodiments, the support structure includes, or is, a plate 252. The cookware can be placed on the plate 252 after preparing a meal in a convenient and appealing way. The plate 252 can be made of a wooden material, such as oak. In particular, the plate 252 can be an oak plate.

According to some embodiments, the portable stove 200 does not include the standing legs and/or the wind shields. As an example, the bottom part 110 of the portable stove 200 can be configured to be directly put on the ground. Accordingly, the bottom part 110 can be configured as a supporting device. In some implementations, a plurality of support elements 112 can be mounted to the bottom part 110. The plurality of support elements 112 can be configured to be put on the ground. Damage to the bottom part 110 can be avoided. As an example, the plurality of support elements 112 can be made of an elastic material, such as rubber.

Figure 29:
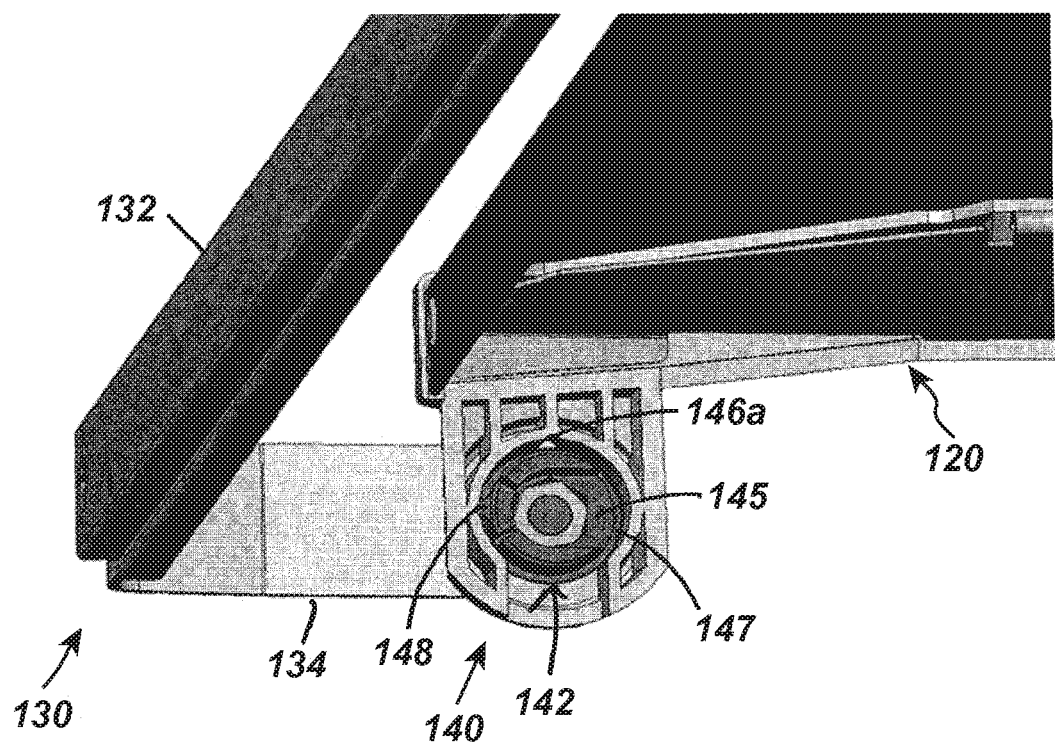
FIG. 29 shows a detailed view of the locking mechanism when locked.
Figure 30:
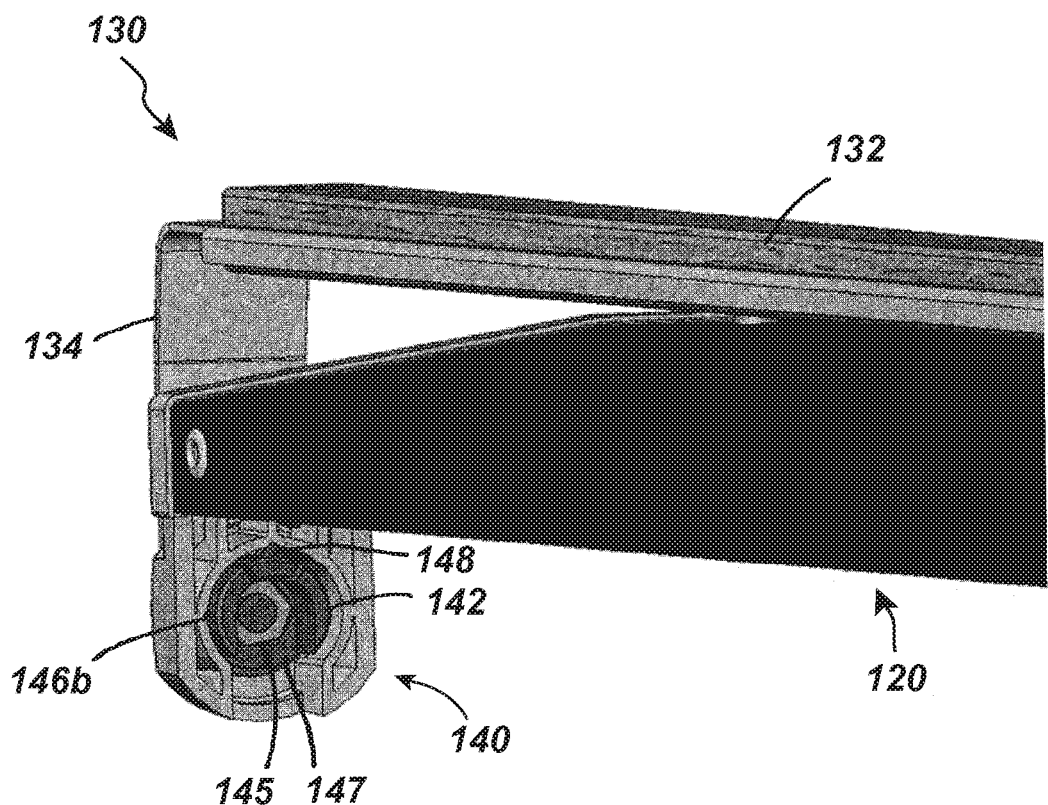
FIG. 30 shows a detailed view of the locking mechanism when opened.
Figure 31:
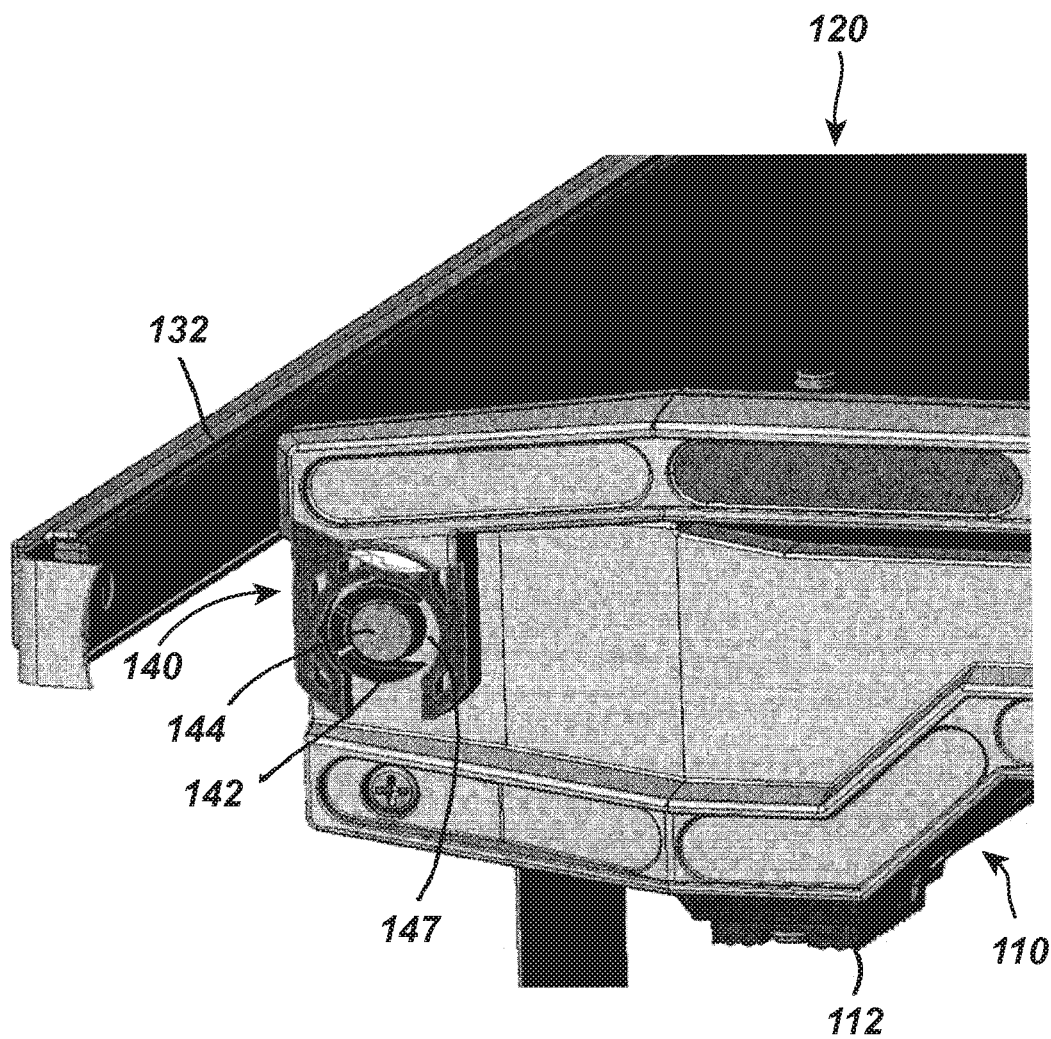
FIG. 31 shows a section cut of the locking mechanism.

FIG. 29 shows the detailed view of the locking mechanism 140 when locked. FIG. 30 shows a detailed view of the locking mechanism 140 when opened. FIG. 31 shows a section cut of the locking mechanism 140.

The locking mechanism 140 can include, or be, the latching mechanism having the latch 142 and the latching member 144. The latch 142 is rotatable around the rotational axis of the handle 130 by the rotation of the handle 130. The latch 142 can have a recess 145 configured for accommodating the latching member 144. The recess 145 extends to a portion of the periphery of the latch 142 to define an insertion opening 147 for the latching member 144 at the periphery of the latch 142. In particular, the latching member 144 can be inserted into the recess 145 via the insertion opening 147 when the handle 130 is in the open position (FIG. 30).

The handle 130 can be moved from the open position into the closed position to secure the latching member 144 inside the recess 145. As an example, the insertion opening 147 can be moved or rotated from a first position (corresponding to the open position of the handle 130) to a second position (corresponding to the closed position of the handle 130) by the rotation of the handle 130. The first position can be a position in which the insertion opening 147 is uncovered such that the latching member 144 can be inserted into the recess 145 via the insertion opening 147. The second position can be a position in which the insertion opening 147 is covered, e.g., by a portion of the locking mechanism 140 and/or the cover lid part 120 such that the insertion opening 147 is blocked and the latching member 144 is secure inside the recess 145. The handle 130 can be moved from the closed position into the open position to release the latching member 144 from the latch 142, for example, through the unblocked insertion opening 147.

According to some embodiments, which can be combined with other embodiments described herein, the locking mechanism 140 includes at least one groove and at least one protrusion 148 (or nose) configured for engagement with the at least one groove. As an example, a protrusion can snap into a respective groove to hold the handle 130 in position. In particular, the at least one protrusion 148 and the at least one groove can be configured to hold the handle 130 in the closed position (FIGS. 29 and 31) and/or in the open position (FIG. 30). In some implementations, two grooves can be provided. A first groove 146a of the two grooves can be configured for engagement with the at least one protrusion 148 to hold the handle 130 in the open position. A second groove 146b of the two grooves can be configured for engagement with the at least one protrusion 148 to hold the handle 130 in the closed position. The first groove 146a and the second groove 146b can be offset by about 90° with respect to the rotational axis of the handle 130. Accordingly, an unintentional movement of the handle 130 can be avoided.

The at least one protrusion 148 and the at least one groove can be provided at different elements of the portable stove 100, 200 for preventing a relative movement between the handle 130 and the cover lid part 120 when the at least one protrusion 148 and the at least one groove are in engagement. As an example, the one or more grooves, such as the first groove 146a and the second groove 146b, can be provided at the cover lid part 120 and the one or more protrusions 148 can be provided at the handle 130 or the latch 142, or vice versa. As an example, the at least one protrusion 148 can be provided at the latch 142 so as to rotate together with the latch 142 connected to the handle 130. The at least one groove can be provided at the cover lid part 120, for example, at the attachment point of the handle 130. Accordingly, the engagement between the one or more protrusions and one of the grooves can lock a relative position of the handle 130 with respect to the cover lid part 120.

The present disclosure provides a portable stove that provides a better locking in the closed state and avoids unintentional opening when the stove is carried around. In particular, the portable stove of the present disclosure has a handle for carrying the portable stove. The handle can additionally operate a locking mechanism for locking the cover lid part and the bottom part together. Accordingly, the handle of the portable stove has a double function. When a user is carrying the portable stove, the handle is in the closed position, preventing a movement of the handle into the open position. An unintentional opening of the portable stove during transportation thereof can be avoided.

While the foregoing is directed to embodiments of the disclosure, other and further embodiments of the disclosure may be devised without departing from the basic scope thereof, and the scope thereof is determined by the appended claims.

The invention claimed is:

1. A portable stove, comprising:
    a housing having a bottom part and a cover lid part, wherein the cover lid part is hinged to the bottom part;
    a handle attached to the portable stove and movable between an open position and a closed position; and
    a locking mechanism operable by the handle, wherein the locking mechanism is configured to lock the cover lid part to the bottom part when the handle is in the closed position.

2. The portable stove of claim 1, wherein the locking mechanism is configured to release the locking when the handle is moved into the open position.

3. The portable stove of claim 1, wherein the locking mechanism includes at least one groove and at least one protrusion configured for engagement with the at least one groove.

4. The portable stove of claim 3, wherein the at least one protrusion and the at least one groove are configured to hold the handle in the open position and/or in the closed position.

5. The portable stove of claim 1, wherein the locking mechanism includes at least one latching mechanism having a latch and a latching member, wherein the latch is provided at the handle and the latching member is provided at the bottom part of the housing, or vice versa.

6. The portable stove of claim 5, wherein the latch is movable by the handle into engagement with the latching member to provide for the locking, and wherein the latch is moveable movable by the handle out of engagement with the latching member to release the locking.

7. The portable stove of claim 6, wherein the latching member is a pin member.

8. The portable stove of claim 1, wherein the locking mechanism is configured to lock the cover lid part to the bottom part at two attachment points of the handle.

9. The portable stove of claim 1, wherein the handle is mounted to the portable stove such that the locking is supported by the force of gravity.

10. The portable stove of claim 1, wherein the handle is an elongated member attached to two sides of the portable stove.

11. The portable stove of claim 1, wherein the handle is mounted to the cover lid part.

12. The portable stove of claim 1, wherein the handle has a "U" shape.

13. The portable stove of claim 1, wherein the cover lid part includes a support structure on an outer surface of the cover lid part, wherein the support structure is configured to support cookware.

14. The portable stove of claim 13, wherein the support structure is formed of at least one of a plurality of ribs and a plate.

15. The portable stove of claim 14, wherein the plurality of ribs and/or the plate are made of a wooden material.

16. The portable stove of claim 1, further including at least one wind shield configured to shield a burner from wind when the cover lid part is open.

17. The portable stove of claim 16, wherein the at least one wind shield is mounted to the cover lid part via one or more hinges.

18. The portable stove of claim 1, further including at least one standing leg configured to support the portable stove on the ground.

19. The portable stove of claim 18, wherein the at least one standing leg is removably or foldably mounted to the bottom part of the housing.

20. A method for operating the locking mechanism of the portable stove according to claim 1, comprising:
    moving the handle from the open position into the closed position to lock the cover lid part to the bottom part; and/or
    moving the handle from the closed position into the open position to release the locking.

* * * * *

UNITED STATES PATENT AND TRADEMARK OFFICE
CERTIFICATE OF CORRECTION

PATENT NO.         : 10,499,768 B2
APPLICATION NO.    : 15/739514
DATED              : December 10, 2019
INVENTOR(S)        : Magnus Hagström Page 1 of 1

It is certified that error appears in the above-identified patent and that said Letters Patent is hereby corrected as shown below:

In the Claims

Claim 6,    Column 10,    Line 58,    change "moveable movable by the"
                                      to --movable by the--

Signed and Sealed this
Third Day of March, 2020

Andrei Iancu
*Director of the United States Patent and Trademark Office*